(12) United States Patent
Yamashita

(10) Patent No.: US 8,422,547 B2
(45) Date of Patent: Apr. 16, 2013

(54) TRANSMISSION APPARATUS, TRANSMISSION METHOD, RECEPTION APPARATUS, RECEPTION METHOD AND SIGNAL TRANSMISSION SYSTEM

(75) Inventor: Shigeyki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/028,296

(22) Filed: Feb. 16, 2011

(65) Prior Publication Data

US 2011/0205247 A1 Aug. 25, 2011

(30) Foreign Application Priority Data

Feb. 22, 2010 (JP) ................................ P2010-036209

(51) Int. Cl.
*H04B 1/66* (2006.01)
*G09G 5/00* (2006.01)

(52) U.S. Cl.
USPC ............................ 375/240; 345/650; 345/619

(58) Field of Classification Search .................. 375/240; 345/619, 660
See application file for complete search history.

(56) References Cited

U.S. PATENT DOCUMENTS

| 8,184,126 B2 * | 5/2012 | Peeters et al. .................. 345/611 |
| 8,212,797 B2 * | 7/2012 | Inokawa ....................... 345/204 |
| 2005/0281296 A1 | 12/2005 | Yamashita |
| 2006/0242669 A1 * | 10/2006 | Wogsberg ....................... 725/74 |
| 2010/0149412 A1 * | 6/2010 | Yamashita .................... 348/443 |

FOREIGN PATENT DOCUMENTS

JP 2005 328494 11/2005

\* cited by examiner

*Primary Examiner* — Andy Rao
*Assistant Examiner* — Tsion B Owens
(74) *Attorney, Agent, or Firm* — Frommer Lawrence & Haug LLP; William S. Frommer

(57) ABSTRACT

Disclosed herein is a signal transmission apparatus including a two-pixel sampling out control section, a word sampling out control section, and a readout control section.

13 Claims, 26 Drawing Sheets

R' G' B', Y' $C_B'$ $C_R'$ 4:4:4 SYSTEM

Y' $C_B'$ $C_R'$ 4:2:2 SYSTEM

R' OR $C_R'$ COMPONENT

G' OR Y' COMPONENT

B' OR $C_B'$ COMPONENT

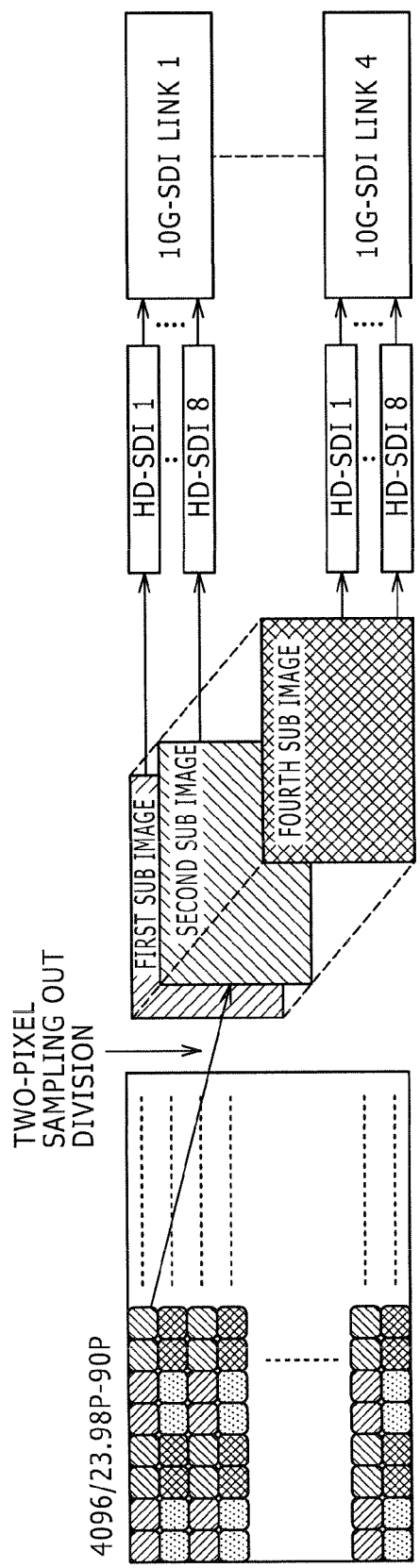

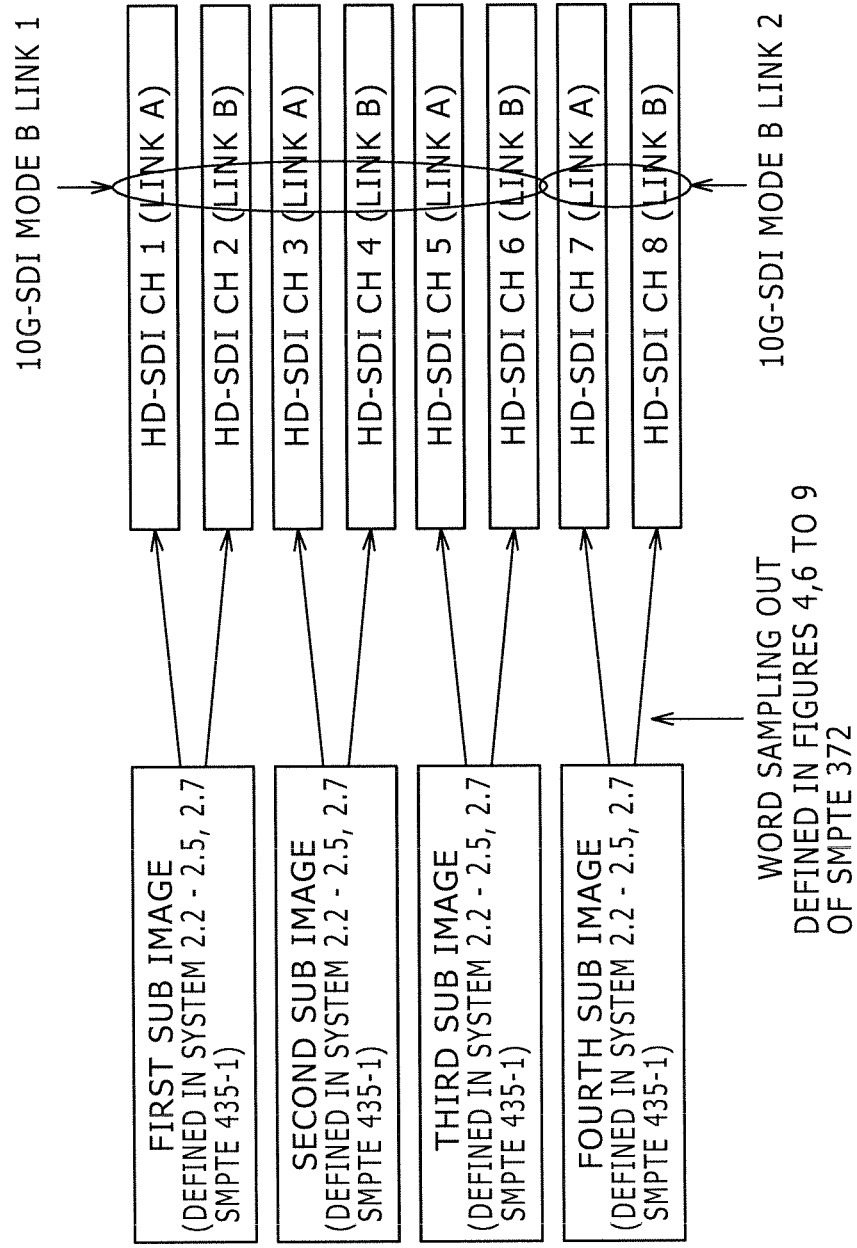

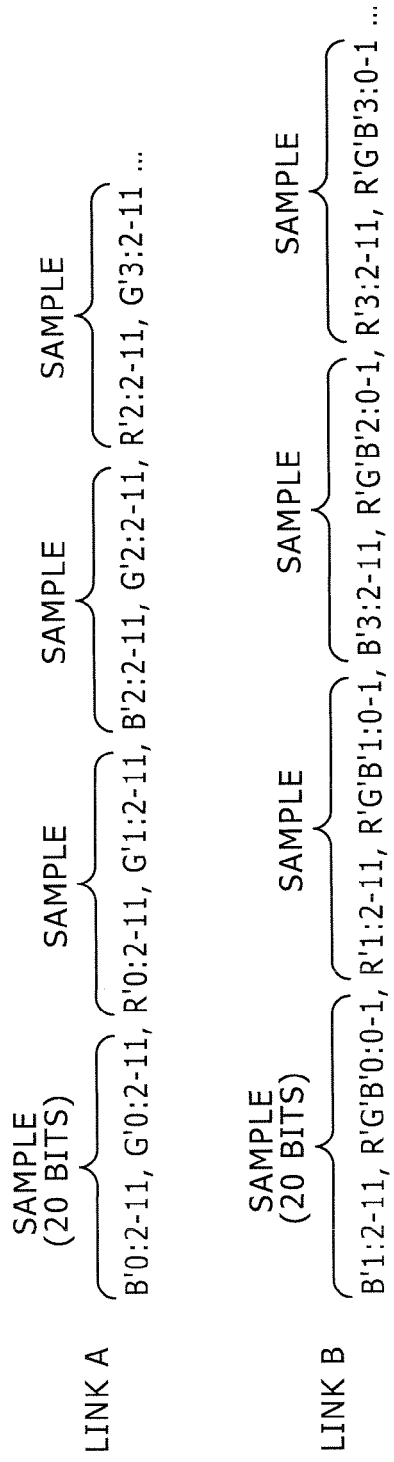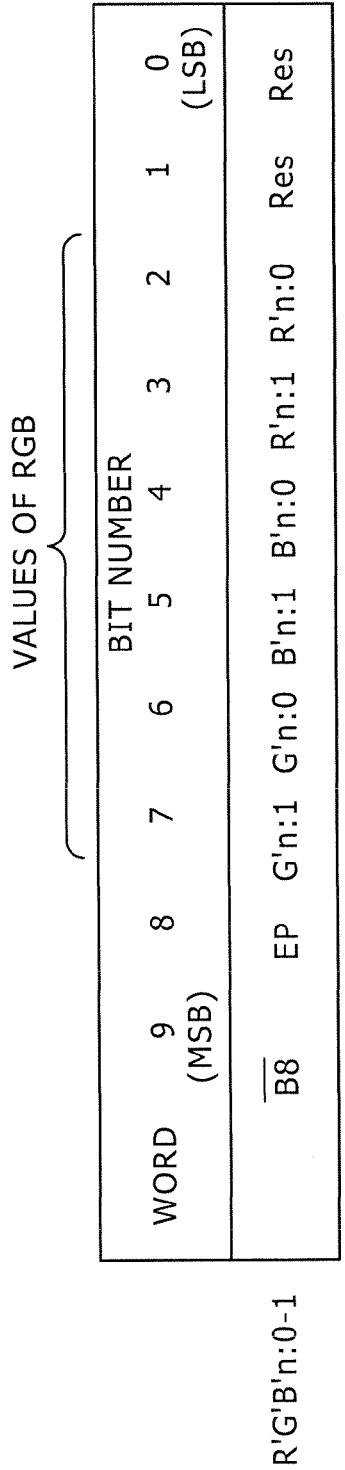

TRANSMISSION APPARATUS, TRANSMISSION METHOD, RECEPTION APPARATUS, RECEPTION METHOD AND SIGNAL TRANSMISSION SYSTEM

BACKGROUND OF THE INVENTION

1. Field of the Invention

This invention relates to a transmission apparatus, a transmission method, a reception apparatus, a reception method and a signal transmission system which can be suitably applied to a case in which an image signal with regard to which the pixel number of one frame exceeds the number of pixels prescribed by the HD-SDI format is serially transmitted.

2. Description of the Related Art

Development of a reception system or an image pickup system for a very high definition image signal which exceeds a high definition (HD) signal which is an existing image signal or video signal with regard to which one frame has 1,920 samples×1,080 lines is proceeding. For example, a UHDTV (Ultra High Definition TV) standard which is a broadcasting system of a next generation having a number of pixels equal to four times or 16 times that of the existing HD is being standardized by international associations. The international associations include the ITU (International Telecommunication Union) and the SMPTE (Society of Motion Picture and Television Engineers).

The image standard proposed by the ITU or the SMPTE relates to an image signal having a sample number and a line number equal to twice or four times those of 1,920 samples× 1,080 lines, that is, having 3,840 samples×2,160 lines or 7,680 samples×4,320 lines. That one of the image signals which is standardized by the ITU is called LSDI (Large Screen Digital Imagery) while that one which is proposed by the SMPTE is called UHDTV. As regards the UHDTV, signals of the following table 1 are prescribed.

TABLE 1

| System category | System name | Luminance or R' G' B' sample number per effective line | Effective line number per frame | Frame rate (Hz) |
|---|---|---|---|---|
| UHDTV1 | 3840 × 2160/50/P | 3840 | 2160 | 50 |
|  | 3840 × 2160/59.94/P | 3840 | 2160 | 60/1.001 |
|  | 3840 × 2160/60/P | 3840 | 2160 | 60 |
| UHDTV2 | 7680 × 4320/50/P | 7680 | 4320 | 50 |
|  | 7680 × 4320/59.94/P | 7680 | 4320 | 60/1.001 |
|  | 7680 × 4320/60/P | 7680 | 4320 | 60 |

Then, upon product development directed to 3840×2160/ 60 P, products at an initial stage are estimated as image apparatus compatible with 3840×2160/24 P, 25 P and 30 P. In addition, it is desired to supply products ready for such a frame rate other than 30 P such as 24 P by looking for an application which can utilize various 4k images.

As an interface for them, a transmission standard known as mode D is added to the SMPTE 435-2, and standardization is completed as SMPTE 435-2-2009. On the basis of this system, according to the UHDTV standard, a system wherein 3840×2160/60 P transmits a signal of 10 Gbps by two channels and 7680/60 P transmits a signal of 10 Gbps by eight channels is proposed as SMPTE 2036-3 by the SMPTE.

While 3840×2160/60 P is an image signal which an image producing person in a broadcasting station or the like intends to transmit, a cinema producing person in the world of cinema wants that a 2048×1080 signal or a 4096×2160 signal can be transmitted in order to transmit an image signal in a cinema region. To this end, the DCDM (Digital Cinema Distribution Master), D-cinema AFR (Additional Frame Rate), cinematography production image format is proposed by the SMPTE. Table 2 below indicates standards of a 4096×2160 signal proposed by the SMPTE as examples of a configuration of a pixel sample in the cinema region (such pixel sample may be hereinafter referred to merely as "pixel" or "sample") and a frame rate.

TABLE 2

| System No. | System name | Frame rate (Hz) |
|---|---|---|
| 1 | 4096 × 2160/60/P | 60 |
| 2 | 4096 × 2160/59.94/P | 60/1.001 |
| 3 | 4096 × 2160/50/P | 50 |
| 4 | 4096 × 2160/48/P | 48 |
| 5 | 4096 × 2160/47.95/P | 48/1.001 |
| 6 | 4096 × 2160/30/P | 30 |
| 7 | 4096 × 2160/29.97/P | 30/1.001 |
| 8 | 4096 × 2160/25/P | 25 |
| 9 | 4096 × 2160/24/P | 24 |
| 10 | 4096 × 2160/23.98/P | 24/1.001 |

Incidentally, the SMPTE 435-2 describes mapping of data of HD-SDIs which are parallel streams of 10 bits prescribed by the SMPTE 292 to a serial interface of 10.692 Gbps. Usually, an HD-SDI is configured from fields of EAV, horizontal auxiliary data space (HANG data, also called horizontal blanking period), SAV and image data disposed in this order.

Here, examples of a method of multiplexing data included in an HD-SDI of a plurality of channels are described with reference to FIGS. 25 and 26. The methods of multiplexing data are prescribed as mode B and mode D in the SMPTE 435-2.

FIG. 25 illustrates the method of the mode B.

The mode B is a method of multiplexing data into HD-SDIs of six channels CH1 to CH6.

In the mode B, data are multiplexed in the image data region and the horizontal auxiliary data space of a 10.692 Gbps stream. The image/EAV/SAV data of 4 words included in the HD-SDI of six channels CH1 to CH6 are subjected to 8B/10B conversion so that they are encoded into a data block of 5 words or 50 bits. Then, the data block is multiplexed into the image data region of the 10.692 Gbps stream in the order of the channels beginning with the top of the SAV.

Meanwhile, the horizontal auxiliary data spaces of the HD-SDI of the four channels CH1 to CH4 are subjected to 8B/10B conversion so that they are encoded into a data block of 50 bits and multiplexed into the horizontal auxiliary data space of the 10.692 Gbps stream in the order of the channels. It is to be noted, however, the horizontal auxiliary data spaces of the HD-SDI of the channels CH5 and CH6 are not transmitted.

FIG. 26 illustrates the method of the mode D.

The mode D is a method of multiplexing HD-SDIs of eight channels CH1 to CH8.

In the mode D, data are multiplexed into the image data region and the horizontal auxiliary data space of a 10.692 Gbps stream. At this time, the image/EAV/SAV data of the HD-SDIs of the channels CH1, CH3, CH5 and CH7 are extracted by 40 bits and scrambled so as to be converted into data of 40 bits. Meanwhile, the image/EAV/SAV data of the HD-SDIs of the channels CH2, CH4, CH6 and CH8 are extracted by 32 bits and converted into data of 40 bits by 8B/10B conversion. The data are added to each other to form data of 80 bits. The encoded 8-word or 80-bit data is multiplexed into the image data region of the 10.692 Gbps stream.

At this time, to the front half data block of 40 bits from within the data block of 80 bits, the data block of 40 bits of the even-numbered channels obtained by the 8B/10B conversion is allocated. Then, to the rear half data block of 40 bits, the data block of scrambled 40 bits of the odd-numbered channels is allocated. Therefore, in the one data block, for example, the data blocks are multiplexed in the order of, for example, the channels CH2 and CH1. The reason why the order is changed in this manner is that a content ID for identifying a mode to be used is included in the data block of 40 bits of the even-numbered channels obtained by the 8B/10B conversion.

Meanwhile, the horizontal auxiliary data space of the HD-SDI of the channel CH1 is subjected to 8B/10B conversion and encoded into a data block of 50 bits. Then, the data block is multiplexed into the horizontal auxiliary data space of the 10.692 Gbps stream. It is to be noted that the horizontal auxiliary data spaces of the HD-SDI of the channels CH2 to CH8 are not transmitted.

Meanwhile, Japanese Patent Laid-Open No. 2005-328494 discloses a technique for transmitting a 3840×2160/30 P, 30/1.001 P/4:4:4/12-bit signal, which is a kind of a 4k×2k signal which is a very high resolution signal of 4k samples×2k lines at a bit rate higher than 10 Gbps. It is to be noted that the term "3840×2160/30 P" indicates a "pixel number in the horizontal direction"×"line number in the vertical direction"/ "frame number per one second." Further, "4:4:4" represents the ratio of a "red signal R:green signal G:blue signal B" in the case of the primary color signal transmission method or the ratio of a "luminance signal Y:first color difference signal Cb:second color difference signal Cr" in the case of the color difference signal transmission method.

SUMMARY OF THE INVENTION

Incidentally, in the case where the mode D is used in order to transmit image data, it is known that an image signal of 3840×2160/23.98–30 P can be transmitted by a 10G-SDI of one channel. However, in the case where 4096×2160/23.98 P–30 P is assumed as an image signal, since the pixel sample number within an effective image signal is greater, pixel samples cannot be multiplexed using the line structure of the mode D. In short, it was found that, even if the mode D is used, a 4096×2160/23.98 P–30 P image signal cannot be transmitted. Further, according to the SMPTE, although image signal standards for up to 4096 samples×2160 lines/23.98 P–60 P are being standardized, argument or standardization of interfaces provided in a signal transmission apparatus and a signal reception apparatus is not carried out.

Further, pixel structures/frame rates proposed at present are 4096×2160/23.98 P, 24 P, 25 P, 29.97 P, 30 P, 47.95 P, 48 P, 50 P, 59.94 P and 60 P. However, it is estimated that also 90 P which is a triple speed signal or a further higher frame rate signal becomes necessary in the future. Therefore, it becomes necessary to transmit an image signal utilizing existing transmission formats at various frame rates.

Therefore, it is desirable to provide a transmission apparatus, a transmission method, a reception apparatus, a reception method and a signal transmission system by which pixel samples which cannot be transmitted by the mode D are transmitted using an existing transmission format.

The present invention is applied to a case in which an image signal with regard to which the number of pixels of one frame exceeds a pixel number prescribed by the HD-SDI format whose pixel number of one frame is 4096 in the maximum× 2160 in the maximum is transmitted.

Here, from among pixel samples extracted from each frame defined by an image signal, two pixel samples which are adjacent each other on the same line are sampled out.

Then, the pixel samples on an odd-numbered line of each frame are sampled out alternately to the first sub image and the second sub image from among the first to fourth sub images prescribed by the SMPTE 435-1.

Thereafter, the pixels on an even-numbered line of each frame are sampled out alternately to the third sub image and the fourth sub image.

Then, the pixel samples sampled out to the first to fourth sub images are sampled out for each word to map the first to fourth sub images to an active period of two by two HD-SDIs of the mode B prescribed in the SMPTE 435-2.

Then, the HD-SDIs of the mode B are outputted.

Further, according to the present invention, HD-SDIs of the mode B prescribed by the SMPTE 435-2 are stored into a storage section.

Then, pixel samples extracted from an active period of the HD-SDIs of the mode B read out from the storage section are multiplexed into first to fourth sub images prescribed by the SMPTE 435-1 for each word.

Then, the pixel samples extracted two by two pixels from the first sub image and the second sub image are multiplexed with a frame defined by an image signal wherein the number of pixels of one frame exceeds a pixel number prescribed by an HD-SDI format whose pixel number of one frame is 4096 in the maximum×2160 in the maximum. At this time, the pixel samples are multiplexed in an adjacent relationship to each other on an odd-numbered line of the frame.

Then, the pixel samples extracted two by two pixels from the third sub image and the fourth sub image are multiplexed in an adjacent relationship on an even-numbered line of a frame defined by the image signal.

In the present invention, two-pixel sampling out and word sampling out are carried out for an inputted signal, and signals wherein pixel samples are multiplexed in an active period of HD-SDIs of the mode B are transmitted. On the other hand, for the received signals, pixel samples are extracted from the active period of the HD-SDIs, and word multiplexing and two-pixel multiplexing are carried out to reproduce the signal.

With the signal transmission apparatus, signal reception apparatus and signal transmission system, by mapping into an active period of HD-SDIs of the mode B, an image signal with regard to which the pixel number of one frame exceeds a pixel number prescribed by the HD-SDI format can be transmitted and received. Therefore, a transmission line which is used heretofore can be utilized without newly providing a new transmission line, and consequently, the convenience is improved advantageously.

BRIEF DESCRIPTION OF THE DRAWINGS

FIG. 6 is a diagrammatic view illustrating processing by the mapping section of FIG. 3 when it maps pixel samples two by two pixels;

FIG. 8 is a block diagram illustrating an example wherein first to fourth sub images to which pixel samples are mapped are divisionally mapped to a link A and a link B in accordance with a prescription of the SMPTE 372M;

FIGS. 9A and 9B are views illustrating examples of a data structure of the links A and B according to the SMPTE 372M;

DETAILED DESCRIPTION OF THE PREFERRED EMBODIMENTS

In the following, preferred embodiments of the present invention are described. It is to be noted that the description is given in the following order.

1. First Embodiment [Mapping control of pixel samples: example of 4096×2160/23.98 P–30 P/4:4:4, 4:2:2/10 bits, 12 bits]
2. Second Embodiment [Mapping control of pixel samples: example of 4096×2160/47.95 P–60 P/4:4:4, 4:2:2/10 bits, 12 bits]
3. Third Embodiment [Mapping control of pixel samples: example of 4096×2160/71.928 P–90 P/4:4:4, 4:2:2/10 bits, 12 bits]
4. Fourth Embodiment [Mapping control of pixel samples: example of 4096×2160/71.928 P–90 P/4:4:4, 4:2:2/10 bits, 12 bits]

1. First Embodiment

Example of 4096×2160/23.98 P–30 P/4:4:4, 4:2:2/10 Bits, 12 Bits

In the following, a first embodiment of the present invention is described with reference to FIGS. 1 to 12.

Here, a method of sampling out pixel samples of 4096× 2160/23.98 P, 24 P, 25 P, 29.97 P, 30 P/4:4:4, 4:2:2/10 bits, 12 bits is described. In the following description, 23.98 P, 24 P, 25 P, 29.97 P and 30 P are sometimes referred to simply as "23.98 P–30 P."

Figure 1:
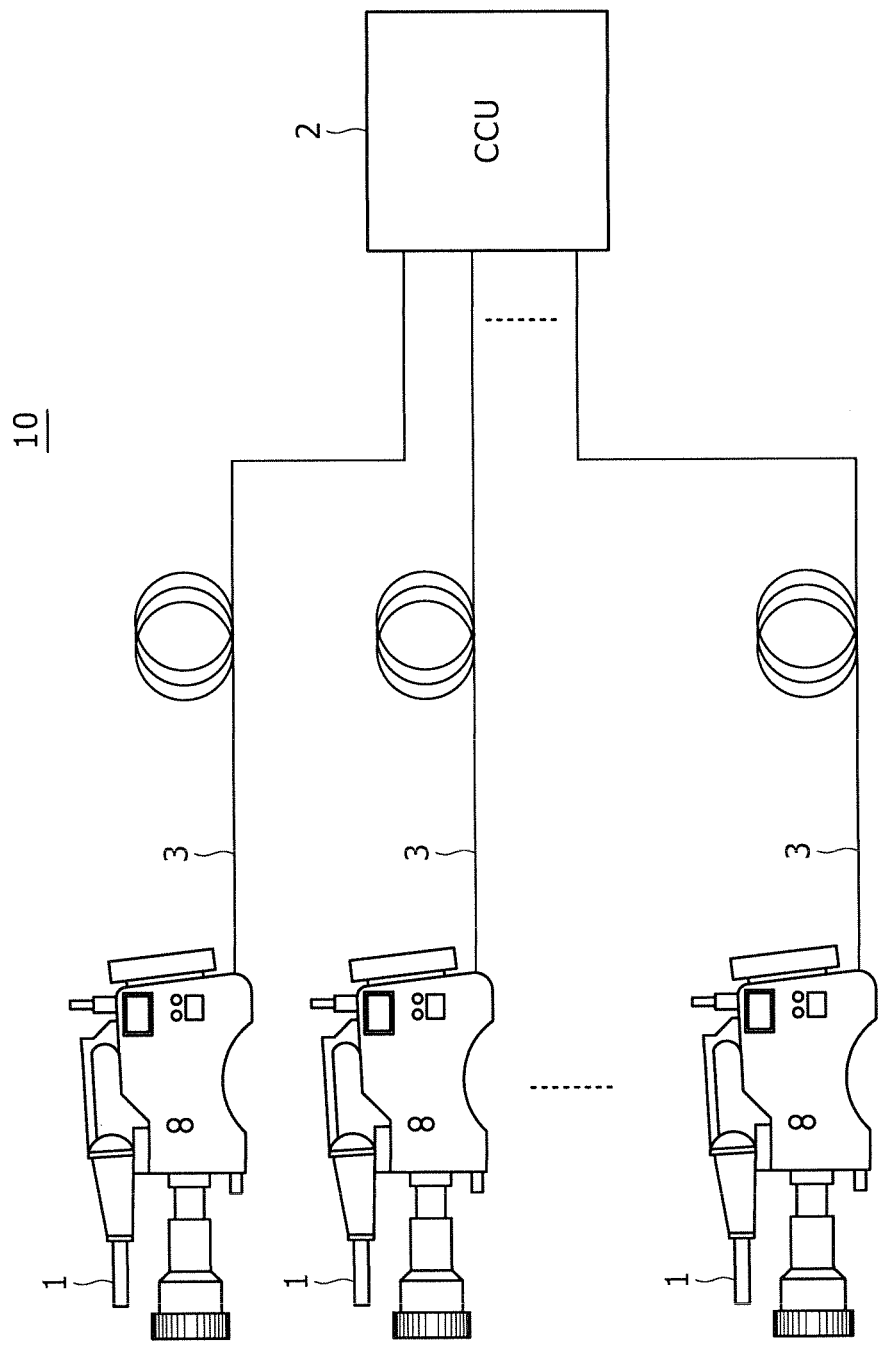
FIG. 1 is a schematic view showing a general configuration of a camera transmission system for a television broadcasting station according to a first embodiment of the present invention.

FIG. 1 shows a general configuration of a signal transmission system 10 for a television broadcasting station to which the present embodiment is applied. Referring to FIG. 1, the signal transmission system 10 is configured from a plurality of broadcasting cameras 1 and a camera control unit CCU 2. The broadcasting cameras 1 are connected to the CCU 2 by respective optical fiber cables 3. Each of the broadcasting cameras 1 is used as a signal transmission apparatus to which a signal transmission method for transmitting a serial digital signal is applied, and the CCU 2 is used as a signal reception apparatus to which a signal reception method for receiving the serial digital signal is applied. Further, the signal transmission system 10 which includes the combination of the broadcasting cameras 1 and the CCU 2 is used as a signal transmission system for transmitting and receiving a serial digital signal.

The broadcasting cameras 1 have the same configuration thereamong. The broadcasting cameras 1 function as signal transmission apparatus which generate a 4096×2160/23.98 P–30 P/4:4:4/10-bit, 12-bit signal for digital cinema as a 4k×2k signal. In the following description, a very high resolution signal of 4k samples×2k lines is referred to as "4k×2k signal."

The CCU 2 is a unit which controls the broadcasting cameras 1, receives image signals from the broadcasting cameras 1 and transmits an image signal (return video) for causing a monitor of each broadcasting camera 1 to display images during image pickup by the other broadcasting cameras 1. The CCU 2 functions as a signal reception apparatus for receiving image signals from the broadcasting cameras 1.

<DWDM/CWDM Wavelength Multiplexing Transmission Technique>

Here, a DWDM/CWDM wavelength multiplexing transmission technique is described.

A method of multiplexing and transmitting light of a plurality of wavelengths through a single optical fiber is called WDM (Wavelength Division Multiplexing). The WDM is roughly divided into the following three methods depending upon the wavelength distance.

(1) Two-Wavelength Multiplexing Method

Two or three waves spaced from each other like 1.3 μm and 1.55 μm are multiplexed and transmitted by a single optical fiber.

(2) DWDM (Dense Wavelength Division Multiplexing) Method

A method of multiplexing and transmitting light in a high density at such intervals of 25 GHz, 50 GHz, 100 GHz or 200 GHz in light frequency or of approximately 0.2 nm, 0.4 nm or 0.8 nm in light wavelength particularly in the 1.55 μm band is called DWDM. Standardization of the center frequency and so forth has been carried out by the ITU-T (International Telecommunication Union Telecommunication standardization sector). Since the wavelength interval of the DWDM is as narrow as 100 GHz, the number of waves to be multiplexed can be made as great as several tens to hundred and communication of a very high capacity can be anticipated. However, since it is necessary for the oscillation wavelength width to be sufficiently narrower than the wavelength interval of 100 GHz and besides it is necessary for a semiconductor laser to be controlled so that the center frequencies may comply with the ITU-T standard, a high cost is required for the device and high power consumption is required for the system.

(3) CWDM (Coarse Wavelength Division Multiplexing) Method

On the other hand, in recent years, attention has been and is being given to a wavelength multiplexing technique called CWDM wherein the wavelength interval is set to 10 to 20 nm which is greater by more than one digit than that in the DWDM. Since the wavelength interval is comparatively great, there is no necessity to set the oscillation wavelength band width of the semiconductor laser so narrow as that in the DWDM and there is no necessity to control the temperature of the semiconductor laser either. Therefore, it is possible to configure the system at a low cost and with low power consumption. It is effective for the system which does not require such a very high capacity as the DWDM. As regards the center frequencies, in the case of a 4-channel configuration, for example, 1.511 μm, 1.531 μm, 1.551 μm and 1.571 μm are currently applied popularly, and in the case of an 8-channel configuration, for example, 1.471 μm, 1.491 μm, 1.511 μm, 1.531 μm, 1.551 μm, 1.571 μm, 1.591 μm and 1.611 μm are currently applied popularly.

Figure 2:
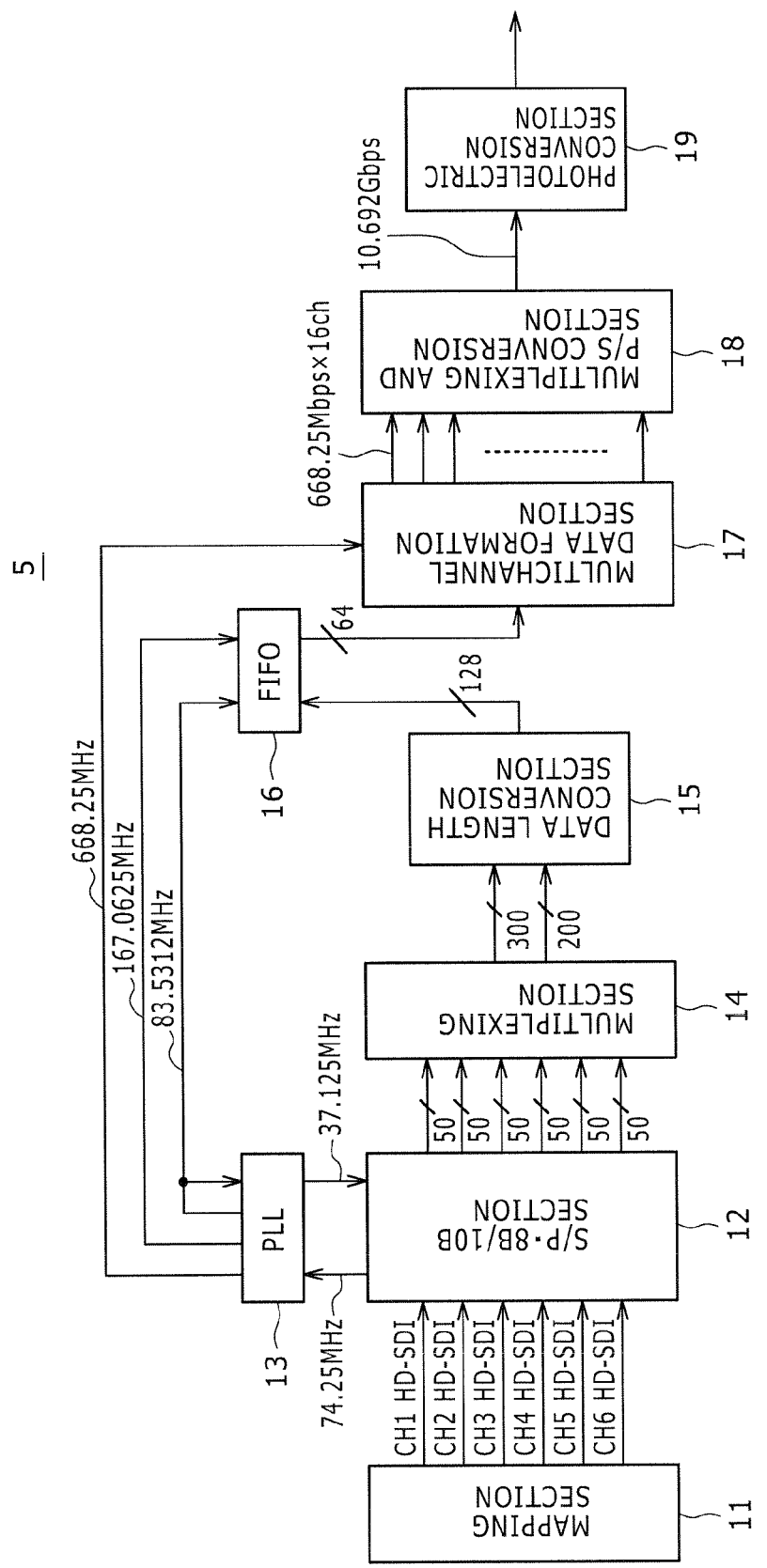
FIG. 2 is a block diagram showing an example of an internal configuration of a signal transmission apparatus in a circuit configuration of a broadcasting camera shown in FIG. 1.

FIG. 2 shows a signal transmission apparatus which relates to the present embodiment from within a circuit configuration of the broadcasting camera 1. A 4096×2160/23.98 P–30 P/4:4:4/12-bit signal produced by an image pickup section and an image signal processing section both not shown in the broadcasting camera 1 is sent to a mapping section 11.

The 4096×2160/23.98 P–30 P/4:4:4/10-bit, 12-bit signal is a signal of a 36-bit width wherein a G data sequence, a B data sequence and an R data sequence all having a word length of 12 bits are disposed in parallel and in synchronism with each other. The one frame period is 1/24 second and includes a period of 2,160 effective lines. The pixel number of one frame of the input image signal exceeds the pixel number prescribed by the HD-SDI format. Then, an audio signal is inputted in synchronism with the input image signal.

In each effective line period, a timing reference signal EAV (End of Active Video), a line number LN, an error detection code CRC and a horizontal auxiliary data space (period for auxiliary/undefined word data) are placed. Further, within each effective line period, a timing reference signal SAV (Start of Active Video) and an active line which is an interval of image data. The sample number of the active line is 4096, and image data of G, B and R are disposed in the active lines of the G data sequence, B data sequence and R data sequence, respectively.

In the present example, the multiplexing method of the mode B (4096×2160/23.98 P–30 P/4:4:4/12 bits) prescribed in the SMPTE 435 is used to transmit data.

First, the mapping section 11 maps a 4096×2160/23.98 P–30 P/4:4:4/10-bit, 12-bit signal to transmission streams of eight channels prescribed by the HD-SDI format.

In the present example, the mode B is used upon transmission of image signals of 25 P, 30 P, 60 P and 90 P in addition to 24 P. In the case where a 30 P, 60 P signal is transmitted in the mode B, the H blank multiplexing number is reduced to two channels which are equal to one half that upon 23.98 P–25 P, 47.95 P–50 P transmission. However, if the multiplexing period of the effective image signal with the data structure of the mode B is expanded, then a 4096×2160 signal can be transmitted. Therefore, it is possible to transmit 4096×2160/23.98 P–30 P by a 10G-SDI of two channels in the mode B and transmit 4096×2160/47.95 P–60 P using three channels. Also it is possible to transmit 4096×2160/71.928 P–90 P of a triple speed using four channels. In this manner, it is made possible to transmit a 4k image signal of the next generation using a 10G-SDI of a plurality of channels.

Figure 3:
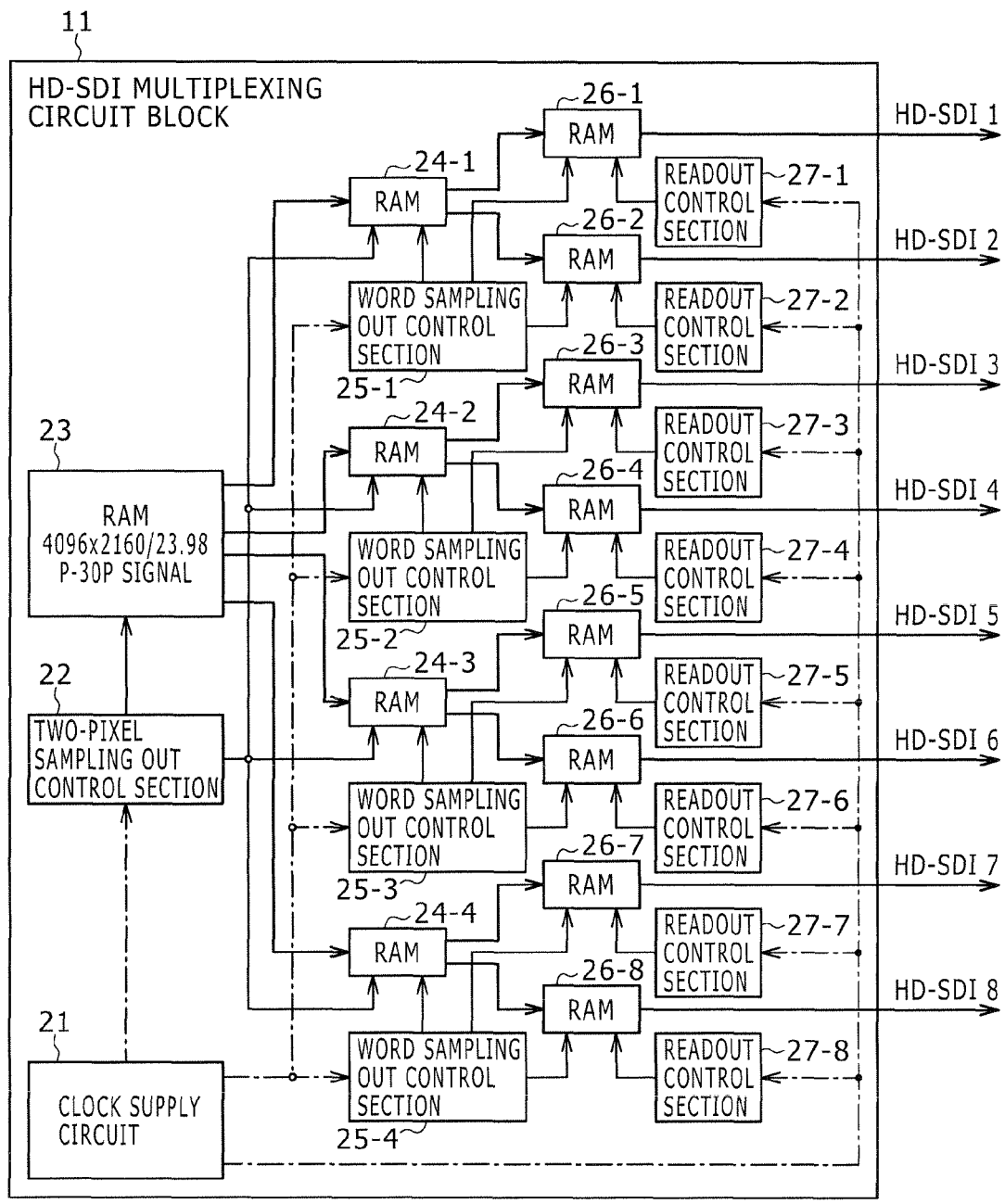
FIG. 3 is a block diagram showing an example of an internal configuration of a mapping section shown in FIG. 2.

FIG. 3 shows an example of an internal configuration of the mapping section 11.

The mapping section 11 includes a clock supplying circuit 21 for supplying a clock to components of the mapping section 11, and a RAM 23 for storing a 4096×2160/23.98 P–30 P image signal. Further, the mapping section 11 includes a two-pixel sampling out control section 22 for controlling two-pixel sampling out (interleave) for reading out pixel samples by two pixels from the RAM 23, and RAMs 24-1 to 24-4 for storing the pixel samples sampled out by two pixels. Further, the mapping section 11 includes word sampling out control sections 25-1 to 25-4 for controlling word sampling out of data read out from the RAMs 24-1 to 24-4, respectively, and RAMs 26-1 to 26-8 into which data sampled out by the word sampling out control sections 25-1 to 25-4 are written temporarily.

Further, the mapping section 11 includes readout control section 27-1 to 27-8 for outputting pixel samples of data read out from the RAMs 26-1 to 26-8 as an HD-SDI of eight channels.

The clock supplying circuit 21 supplies a clock to be used for reading out or writing pixel samples to the two-pixel sampling out control section 22, word sampling out control sections 25-1 to 25-4 and readout control section 27-1 to 27-8. Consequently, the components of the mapping section 11 operate in synchronism with each other.

The 4096×2160/23.98 P–30 P signal inputted from the image sensor not shown is stored into the RAM 23. When an image signal whose pixel number in one frame is 4096 in the maximum×2160 in the maximum is to be transmitted, the two-pixel sampling out control section 22 samples out two pixel samples adjacent each other on the same line from among pixel samples extracted from each frame prescribed by 4096×2160 image signal. Then, the two-pixel sampling out control section 22 maps the pixel samples on odd-numbered lines of each frame from within first to fourth sub images prescribed by the SMPTE 435-1 alternately into the first sub image and the second sub image to map them. Similarly, the two-pixel sampling out control section 22 samples out the pixel samples on the even-numbered lines of each frame alternately into the third sub image and the fourth sub image to map them.

In particular, the two-pixel sampling out control section 22 carries out controlling to extract a 4096×2160/23.98 P–30 P image signal two by two pixels in a line direction for each two upwardly and downwardly adjacent lines and write the read out image signal into the RAMs 24-1 to 24-4. At this time, the pixel samples stored into the RAMS 24-1 to 24-4 by the two-pixel sampling out control section 22 form the first to fourth sub images corresponding to 2048×1080/23.98 P–30 P prescribed by the SMPTE 435-1.

The word sampling out control sections 25-1 to 25-4 sample out pixel samples sampled out into the first to fourth sub images for the individual words. Then, the resulting pixel samples are mapped to an effective period within which the active period of two HD-SDIs is expanded from 1920 samples to 2048 samples.

More particularly, the word sampling out control sections 25-1 to 25-4 read out pixel samples from the RAMs 24-1 to 24-4, respectively, by sampling out the pixel samples for the individual words by a method same as that of FIGS. 4, 6, 7, 8 and 9 of the SMPTE 372. Then, the word sampling out control sections 25-1 to 25-4 convert the read out pixel samples individually into 2048×1080/23.98 P–30 P/4:2:2/10-bit signals of two channels and store the signals into the RAMs 26-1 to 26-8.

Thereafter, the readout control sections 27-1 to 27-8 output the HD-SDI of the mode B read out from the RAMs 26-1 to 26-8, respectively.

In particular, the readout control section 27-1 to 27-8 read out pixel samples from the RAMs 26-1 to 26-8, respectively, in response to a reference clock supplied thereto from the clock supplying circuit 21. Then, the HD-SDIs 1 to 8 of eight channels formed from four pairs of two links A and B are outputted to an S/P·8B/10B section 12 at the succeeding stage.

It is to be noted that, in the present example, in order to carry out two-pixel sampling out and word sampling out, two kinds of memories, that is, the RAMs 24-1 to 24-4 and RAMs 26-1 to 26-8, are used for such sampling out operations at two stages. However, a single memory may be used to carry out word sampling out of data obtained by two-pixel sampling out so that the data are outputted as an HD-SDI of eight channels.

Here, an example of a configuration of serial data of 10.692 Gbps prescribed by the HD-SDI format for one line is described.

Figure 4:
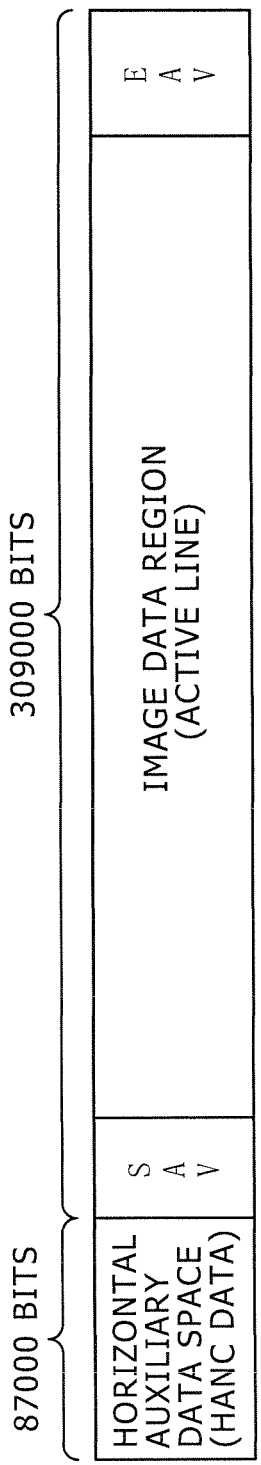
FIG. 4 is a diagrammatic view illustrating an example of a data structure for one line of serial digital data of 10.692 Gbps in the case of 24 P.

FIG. 4 illustrates an example of a data structure for one line of serial digital data of 10.692 Gbps in the case of 24 P.

In FIG. 4, serial digital data including a line number LN and error correction codes CRC are indicated as SAV, active line and EAV, and serial digital data including a region for additional data are indicated as horizontal auxiliary data space.

Then, in the horizontal auxiliary data space, an audio signal is mapped. Complementary data are added to the audio signal to configure the horizontal auxiliary data space to establish synchronism with the HD-SDI signal inputted.

Figure 5A:
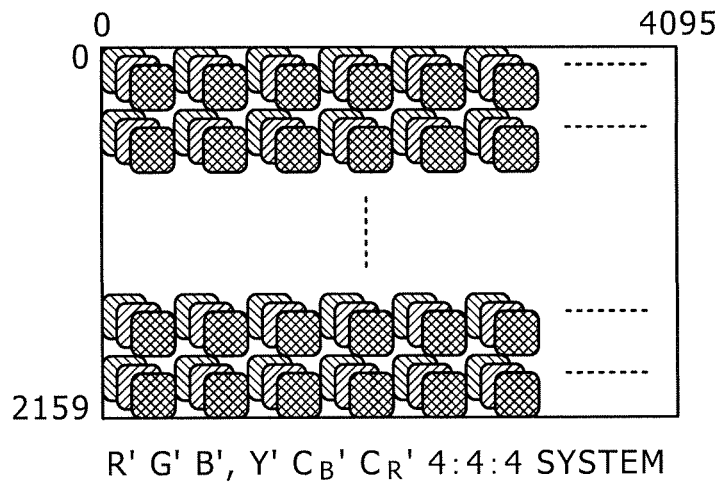
FIGS. 5A and 5B are schematic views illustrating examples of a sample structure of the UHDTV standard.
Figure 5B:
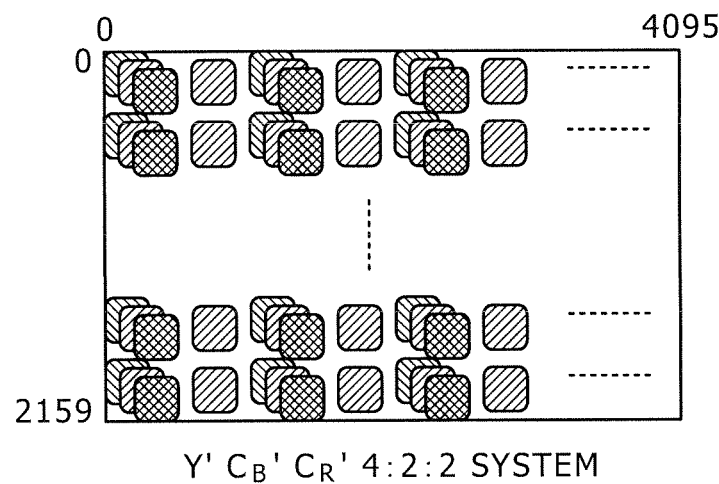

FIGS. 5A and 5B illustrate an example of a sample structure of the 4096×2160 signal standard. As a frame used in description with reference to FIGS. 5A and 5B, one frame is configured from 4096×2160 samples. Such one frame is hereinafter referred to as one frame of a 4k×2k signal.

According to the 4096×2160 signal standard, two sample structures described below are available. It is to be noted that, in the SMPTE standard, a signal having a dash "'" applied thereto like R', G' or B' represents a signal to which gamma correction is applied.

FIG. 5A illustrates the sample structure of the R'G'B', Y'Cb'Cr' 4:4:4 system. In this system, RGB or YCbCr components are included.

FIG. 5B illustrates the sample structure of the Y'Cb'Cr' 4:2:2 system. In this system, YCbCr components are included in odd-numbered samples, and a component of Y is included in even-numbered samples.

FIG. 6 illustrates an example of processing executed by the mapping section 11 to map pixel samples.

First, the two-pixel sampling out control section 22 samples out a 4096×2160/23.98 P–30 P/4:4:4, 4:2:2/10-bit, 12-bit signal for one frame or one screen image for every two pixels in a line direction. Then, sampled out signals are multiplexed into active regions for the first to fourth sub images whose active period of the HD image format is increased to 2048 samples.

At this time, the two-pixel sampling out control section 22 maps the signals sampled out for every two pixels to a 2048× 1080/23.98 P–30 P/4:4:4, 4:2:2/10-bit, 12-bit signal of four channels. Here, the 2048×1080/23.98 P–30 P/4:4:4, 4:2:2/ 10-bit, 12-bit signal is referred to as "sub image." In the present example, the signals sampled out for every two pixels are mapped to the first to fourth sub images.

Then, the word sampling out control sections 25-1 to 25-4 carry out word sampling out of the 2048×1080/23.98 P–30 P/4:4:4, 4:2:2/10-bit, 12-bit signals mapped to the first to fourth sub images in accordance with a predetermined format. As a result, the word sampling out control sections 25-1 to 25-4 generate a 2048×1080/23.98 P–30 P/4:2:2/10-bit signal of two channels, and the readout control section 27-1 to 27-8 output the produced signals as HD-SDI links 1 to 8.

Now, an example of detailed processing of a step carried out by the mapping section 11 to map pixel samples is described.

Figure 7:
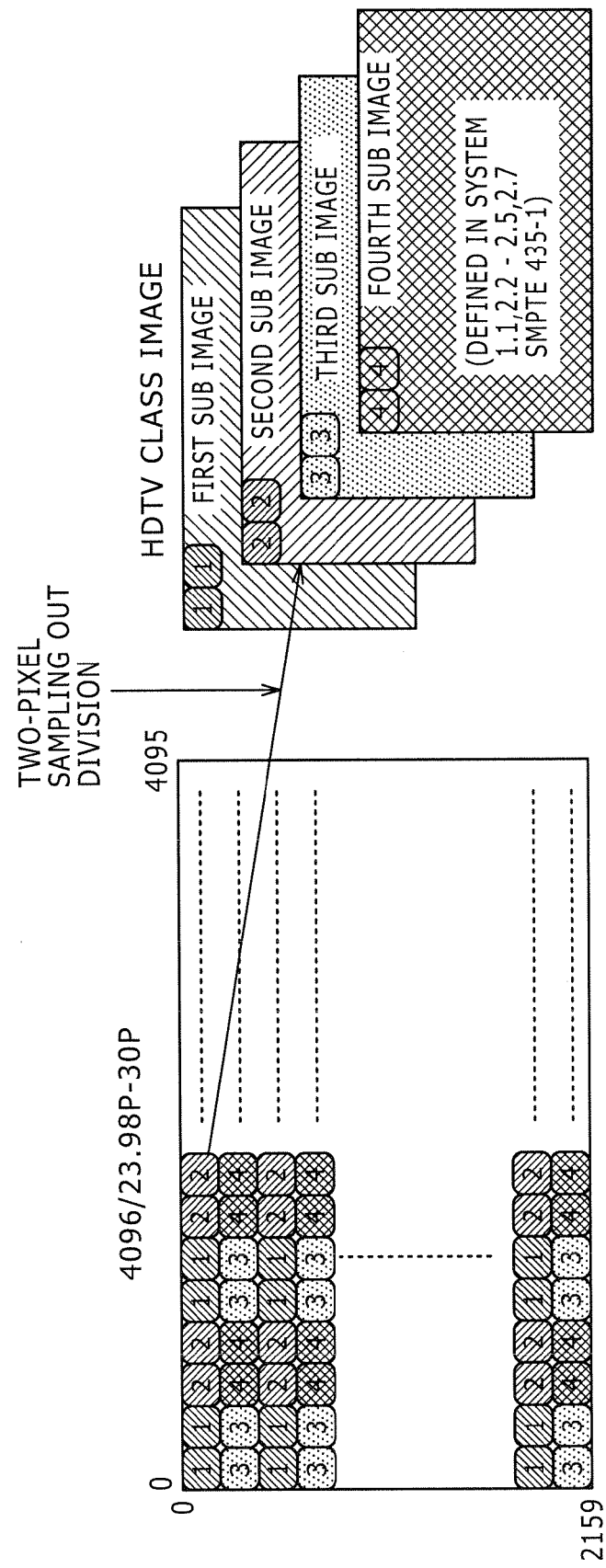
FIG. 7 is a similar view but illustrating an example wherein pixel samples are sampled out two by two pixels to map the pixel samples to sub images.

FIG. 7 illustrates an example wherein the two-pixel sampling out control section 22 maps pixel samples included in one frame to first to fourth sub images.

The two-pixel sampling out control section 22 divides one frame or one screen image into four portions. Consequently, a 4096×2160/23.98 P–30 P/4:4:4, 4:2:2/10-bit, 12-bit signal is mapped to 2048×1080/23.98 P–30 P/4:4:4, 4:2:2/10-bit, 12-bit signals of four channels. Pixel samples of the four divisional frame portions are mapped to an image data region included in HD-SDIs of two channels.

The data region of the first to fourth sub images is set by a 2048×1080/23.98 P–30 P/4:4:4, 4:2:2/10-bit, 12-bit signal. The mapping section 11 maps an audio signal to a complementary data region included in the horizontal auxiliary data space of one of the first, second, third and fourth sub images. If the complementary data region of one channel from between two channels to which an audio signal whose sampling frequency is 48 kHz or 96 kHz is mapped becomes short, then the mapping section 11 maps the audio signal to the complementary data region of the other channel. The mapping section 11 in the present embodiment is defined in that a plurality of channels are multiplexed into the horizontal auxiliary data space of an HD-SDI in which an audio signal is multiplexed.

An audio signal is multiplexed in compliance with the SMPTE 299 which prescribes audio signal multiplexing with an HD-SDI. In particular, the order in which audio signals are multiplexed is such that audio signals are multiplexed in the order of the HD-SDI first channel, second channel, third channel . . . to which 4096×2160 samples are mapped. Further, the audio signals are multiplexed in the order of the HD-SDI of the second channel if the audio multiplex space of the HD-SDI of the first channel is filled up, the HD-SDI of the third channel if the audio multiplex space of the HD-SDI of the second channel is filled up, . . . .

FIG. 8 illustrates an example wherein first to fourth sub images which are 2048×1080/24 P/4:4:4 12-bit signals and to which pixel samples are mapped are divided into links A and B and mapped in compliance with the prescription of the SMPTE 372M.

The SMPTE 435 is a standard for a 10G interface. According to this standard, HD-SDI signals of a plurality of channels are subjected to 8B/10B encoding in a unit of two pixels (40 bits) so as to be converted into signals of 50 bits and are multiplexed for each channel. Then, the resulting signals are serially transmitted at a bit rate of 10.692 Gbps or 10.692 Gbps/1,001 (hereinafter referred to simply as 10.692 Gbps). A technique of mapping a 4k×2k signal to HD-SDI signals is disclosed in FIG. 3 and FIG. 4 of SMPTE 435 Part 1, 6.4 Octa link 1.5 Gbps Class.

Then, from the first to fourth sub images set by the 2048×1080/23.98 P–30 P/4:2:2/10-bit signals, channels CH1 to CH8 are produced by the SMPTE 372M (dual link). The channels CH1 to CH8 include the channel CH1 of the link A and the channel CH2 of the link B, the channel CH3 of the link A and the channel CH4 of the link B, the channel CH5 of the link A and the channel CH6 of the link B, and the channel CH7 of the link A and the channel CH8 of the link B. In the present example, the channels CH1 to CH6 produced from the first to third sub images are transmitted as a 10G-SDI mode B link 1 and the channels CH7 and CH8 produced from the fourth sub image are transmitted as a 10G-SDI mode B link 2.

Further, by mapping the first to fourth sub images to an active period of the HD-SDIs of the dual links, eight channels are produced, and the pixel samples and the audio data can be multiplexed with the 10.692 Gbps interface and transmitted. In the present example, since horizontal blanking signals of the channels CH1, CH2, CH3 and CH4 are transmitted, the audio data can be multiplexed with and transmitted together with the auxiliary data space of the channels CH1, CH2, CH3 and CH4. According to the SMPTE 299, it is prescribed that the horizontal auxiliary data space of the HD-SDIs can transmit 48 kHz audios by 16 channels in the maximum.

FIGS. 9A and 9B illustrate an example of a data structure of the links A and B by the SMPTE 372.

As seen in FIG. 9A, in the link A, one sample include 20 bits, all of which represent RGB values.

As seen in FIG. 9B, also in the link B, one sample includes 20 bits. However, of R'G'B' n: 0-1 of 10 bits, only 6 bits of the bit numbers 2 to 7 represent RGB values. Accordingly, the number of bits which represent RGB values in one sample is 16.

The HD-SDI signals of the channels CH1 to CH8 mapped by the mapping section 11 are sent to the S/P·8B/10B section 12 as seen in FIG. 2. Then, the parallel digital data of the 50-bit width encoded by 8-bit/10-bit encoding is written into a FIFO memory not shown in response to a clock of 37.125 MHz from a PLL (phase locked loop) 13. Thereafter, the digital data is read out from the FIFO memory in response to another clock of 83.5312 MHz from the PLL 13 while it remains having 50 bits and is sent to a multiplexing section 14 shown in FIG. 2.

If an image signal includes ANC/audio data, then the multiplexing section 14 multiplexes the ANC/audio data into the horizontal auxiliary data space of the HD-SDIs of the mode B formed based on the first to fourth sub images in the order of the channel of the HD-SDIs.

In particular, the multiplexing section 14 multiplexes the image data region of the HD-SDIs of the first to sixth channels which are inputs of the mode B and the horizontal auxiliary data space of the first to fourth channels with a stream of 10.692 Gbps, that is, with a transmission stream. At this time, the multiplexing section 14 arranges the parallel digital data of the 50-bit width of the channels CH1, CH2, CH3, CH4, CH5 and CH6 as illustrated in FIG. 10A.

Figure 10B:
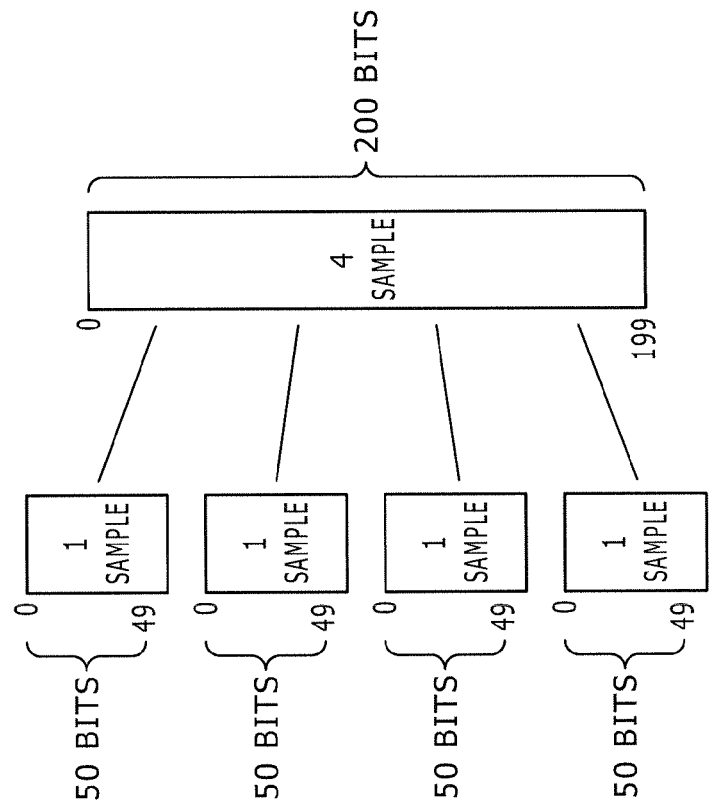
FIGS. 10A and 10B are diagrammatic views illustrating an example of processing carried out by a multiplexing section shown in FIG. 2 when it maps pixel samples.
Figure 10A:
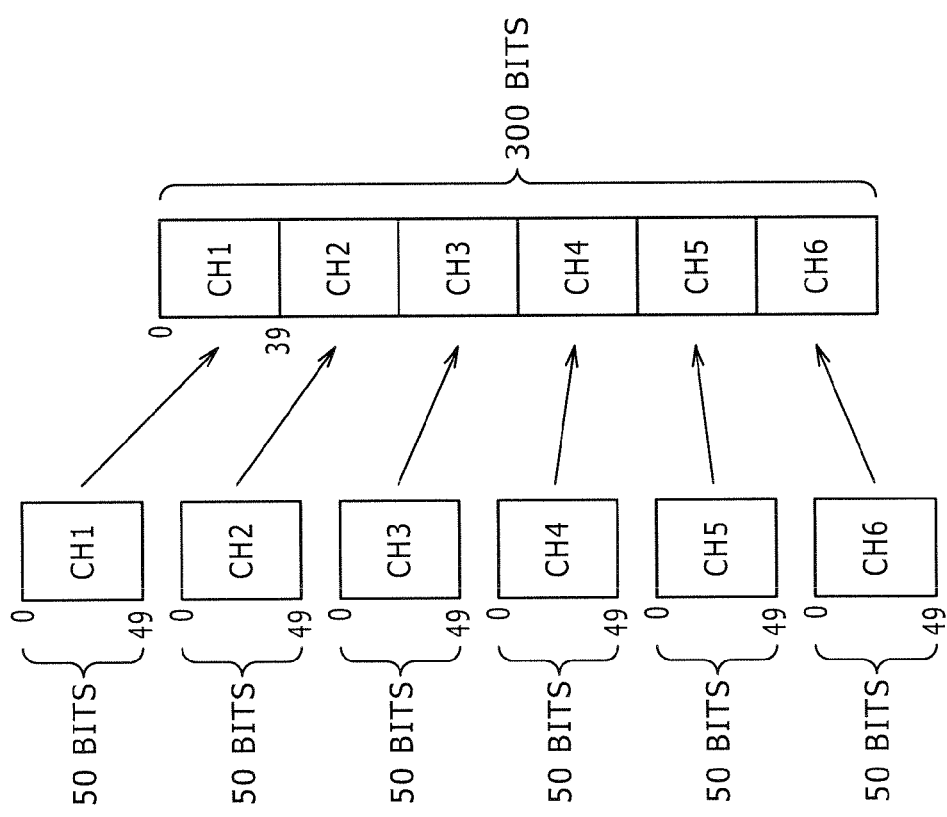

FIGS. 10A and 10B illustrate an example of processing where the multiplexing section 14 maps pixel samples.

In particular, FIG. 10A illustrates an example wherein the multiplexing section 14 multiplexes parallel digital data of the channels CH1 to CH6.

The multiplexing section 14 arranges parallel digital data of the 50-bit width of the channels CH1, CH2, CH3, CH4, CH5 and CH6, which are data only of the timing reference signal SAV, active line, timing reference signal EAV, line number LN and detection code CRC. Then, the multiplexing section 14 multiplexes the channels CH1 to CH6 in order into parallel digital data of 300-bit width.

FIG. 10B illustrates an example of processing wherein the multiplexing section 14 maps pixel samples.

The multiplexing section 14 multiplexes parallel digital data of the 50-bit width including only the horizontal auxiliary data space of the channel CH1 read out from the FIFO memory in the S/P·8B/10B section 12 for four samples to produce parallel digital data of the 200-bit width.

In the present example, the channels CH1, CH2, CH3 and CH4 are transmitted in the mode B in regard to all of the active video period of the HD-SDIs of 74.25 MHz/20 bits obtained by the S/P conversion and the SAV/EAV/LN/CRC regions.

In the present example, as described hereinabove with reference to FIG. 8, the channels CH1 to CH6 are allocated to the first to sixth channels of the HD-SDIs of the 10G-SDI mode B prescribed by the SMPTE 435-2 to form a link 1 which can be transmitted by the 10G-SDI. Meanwhile, the channels CH7 and CH8 are allocated to the first and second channels of the link by which they can be transmitted by the 10G-SDI and are transmitted by the link 2 by which they can be transmitted by the 10G-SDI.

Figure 25:
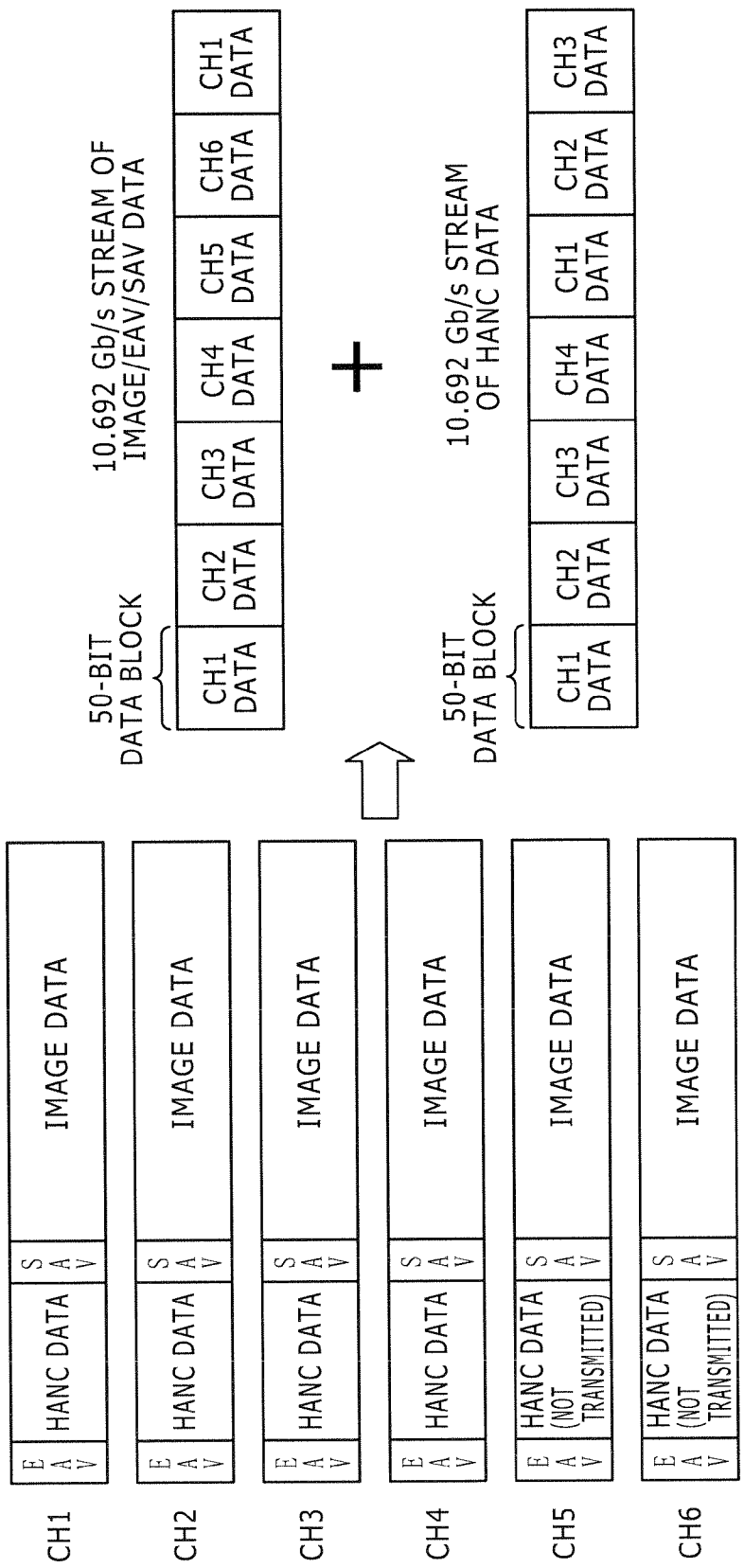
FIG. 25 is a diagrammatic view illustrating an example of the mode B.
Figure 26:
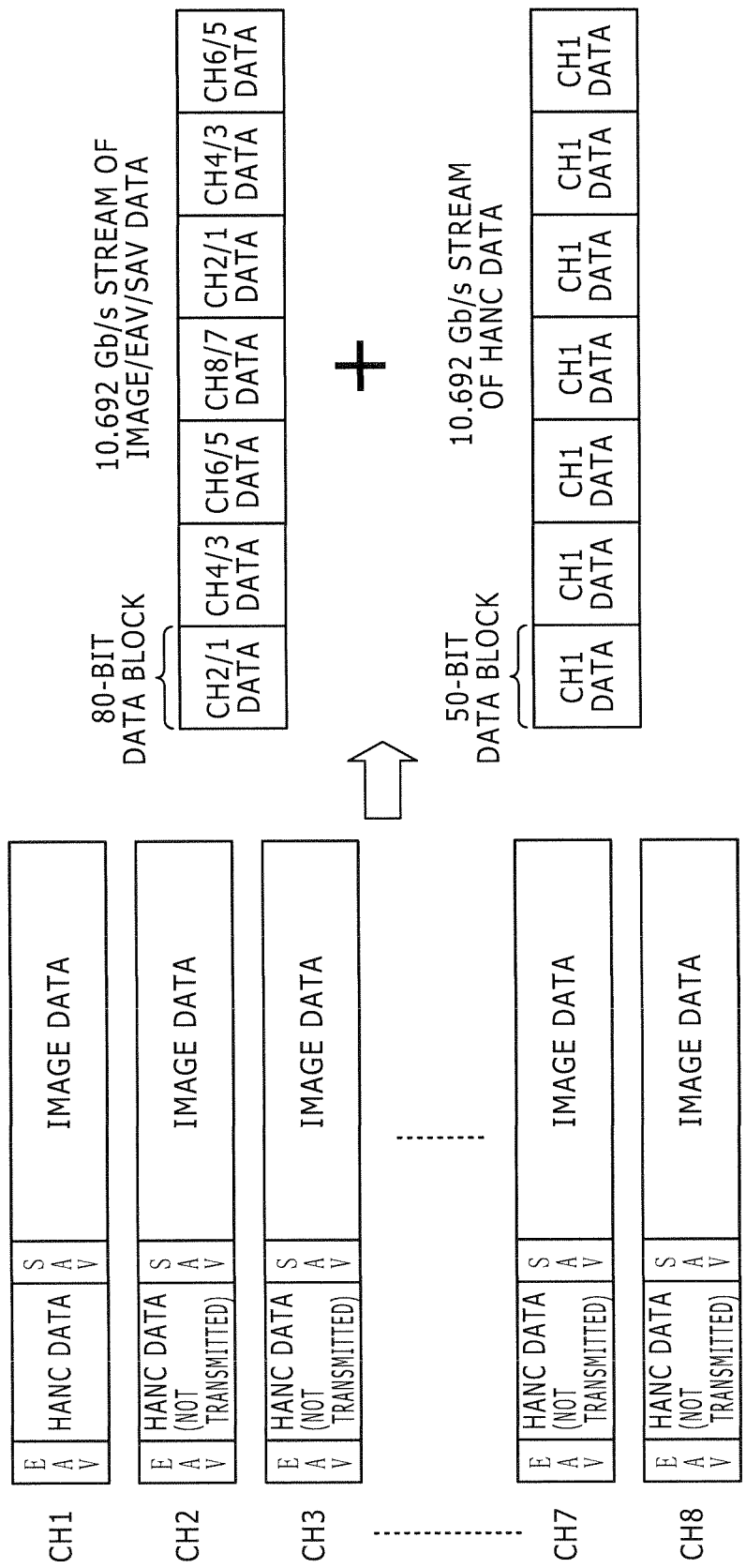
FIG. 26 is a similar view but illustrating an example of the mode D.

Then, in the 10G-SDIs in the mode B, H blanks (refer to FIG. 25) from the first to fourth channels from among the first to sixth channels of the HD-SDIs which can be transmitted are multiplexed and transmitted together with the 10G-SDIs. Here, audio data inserted in the auxiliary data space is referred to as "ANC/audio data." Then, if ANC/audio data is included in the 4096×2160/23.98 P–90 P signal, then the multiplexing section 14 carries out multiplexing in the following procedure.

For example, in the case of 23.98 P, 24 P or 25 P, the channels CH1, CH2, CH3 and CH4 of the 10G-SDI link 1 and the channels CH1 and CH2 of the 10G-SDI link 2 are multiplexed in order.

Further, in the case of 29.98 P or 30 P, the channels CH1 and CH2 of the 10G-SDI link 1 and the channels CH1 and CH2 of the 10G-SDI link 2 are multiplexed in order.

Upon multiplexing of ANC/audio data, even if the H blank of the channel CH1 of the 10G-SDI link 1 is used up to a permissible amount, ANC/audio data may still have to be multiplexed. Only in this instance, the multiplexing section 14 uses the H blank of the channel CH2 of the 10G-SDI link 1.

Here, 48 kHz sampling audio data can be transmitted if the following channel number is used.

If 23.98 P, 24 P or 25 P is used, signals can be transmitted by 16 channels×6 channels=96 channels. Meanwhile, 96 kHz sampling audio signals can be transmitted by 48 channels.

If 29.97 P or 30 P is used, signals can be transmitted by 16 channels×4 channels=32 channels. Meanwhile, 96 kHz sampling audio signals can be transmitted by 16 channels.

Parallel digital data of the 300-bit width and the parallel digital data of the 200-bit width multiplexed by the multiplexing section 14 are sent to a data length conversion section 15. The data length conversion section 15 is configured using a shift register. Data obtained by conversion of the parallel digital data of the 300-bit width into those of the 256-bit width and data obtained by conversion of the parallel digital data of the 200-bit width into those of the 256-bit width are used to form parallel digital data of the 256-bit width. Then, the parallel digital data of the 256-bit width is further converted into parallel digital data of the 128-bit width.

The parallel digital data whose bit width is converted to 128 by the data length conversion section 15 is sent to and written into a FIFO memory 16 by a clock of 83.5312 MHz from the PLL 13.

The parallel digital data of the 128-bit width written in the FIFO memory 16 is read out as parallel digital data of the 64-bit width from the FIFO memory 16 by a clock of 167.0625 MHz from the PLL 13. Thereafter, the parallel digital data of the 64-bit width thus read out is sent to a multi-channel data formation section 17.

The multi-channel data formation section 17 is a 16-bit interface used in a system, for example, of the XSBI (Ten gigabit Sixteen Bit Interface: 10-gigabit Ethernet: Ethernet is a registered trademark). The multi-channel data formation section 17 uses a clock of 668.25 MHz from the PLL 13 to form serial digital data for 16 channels from the parallel digital data of the 64-bit width from the FIFO memory 16. This serial digital data has a bit rate of 668.25 Mbps. The serial digital data of the 16 channels formed by the multi-channel data formation section 17 is sent to a multiplexing and P/S conversion section 18.

The multiplexing and P/S conversion section 18 multiplexes serial digital data of 16 channels from the multi-channel data formation section 17 and applies parallel/serial conversion to parallel digital data obtained by the multiplexing. Consequently, serial digital data of 668.25 Mbps×16=10.692 Gbps is produced. The multiplexing and P/S conversion section 18 in the present embodiment has a function as a parallel/serial conversion section for serially converting the first to fourth sub images mapped by the mapping section 11.

The serial digital data of the bit rate of 10.692 Gbps produced by the multiplexing and P/S conversion section 18 is sent to a photoelectric conversion section 19. The photoelectric conversion section 19 functions as an outputting section for outputting the serial digital data of the bit rate of 10.692 Gbps to the CCU 2. Further, the photoelectric conversion section 19 outputs a transmission stream of 10.692 Gbps multiplexed by the multiplexing section 14. The serial digital data of the bit rate of 10.692 Gbps converted into an optical signal by the photoelectric conversion section 19 is transmitted from the broadcasting camera 1 to the CCU 2 through an optical fiber cable 3.

By using the signal transmission apparatus of the present example, a 4096×2160/23.98 P–30 P/4:4:4, 4:2:2/10-bit, 12-bit signal inputted from the image sensor can be transmitted as serial digital data. In the signal transmission apparatus and the signal transmission method of the present example, a 4096×2160/23.98 P–30 P/4:4:4, 4:2:2/10-bit, 12-bit signal is mapped to HD-SDI signals of the channels CH1 to CH8. The HD-SDI signals of the channels CH1 to CH8 include HD-SDI signals of the channels CH1, CH2, CH3, CH4, CH5 and CH6 of the 10G Mode B link A and HD-SDI signals of the channels CH1 and CH2 of the 10G Mode B link B. Those HD-SDI signals are subjected to serial/parallel conversion. Thereafter, the bits of RGB are subjected to 8-bit/10-bit encoding.

As regards the links A and B, from within data of each horizontal line, RGB bits are extracted only from among data of the timing reference signal SAV, active line, timing reference signal EAV, line number LN and error correct code CRC. Then, the RGB bits are subjected to 8-bit/10-bit encoding. Then, the data of the link A and the data of the link B obtained by the 8-bit/10-bit encoding are multiplexed, and serial digital data of the bit rate of 10.692 Gbps is produced from the parallel digital data obtained by the multiplexing. The produced serial digital data is sent to the CCU 2. Then, when the CCU 2 receives the serial digital data, it produces a 4096×2160/23.98 P–30 P/4:4:4/10-bit, 12-bit signal and sends this signal, for example, to a video tape recorder (VTR) or the like not shown.

It is to be noted that not only a 4096×2160/23.98 P–30 P/4:4:4, 4:2:2/10-bit, 12-bit signal is transmitted from each broadcasting camera 1 to the CCU 2. In particular, also from the CCU 2, return videos (video signals for displaying video images being picked up by the other broadcasting cameras 1) described hereinabove are transmitted to the other broadcasting cameras 1 through the optical fiber cables 3. A return video is produced using a well-known technique. For example, HD-SDI signals for two channels are subjected to 8-bit/10-bit encoding and then multiplexed into serial digital data. Therefore, description of a circuit configuration for the production of a return video is omitted herein.

Figure 11:
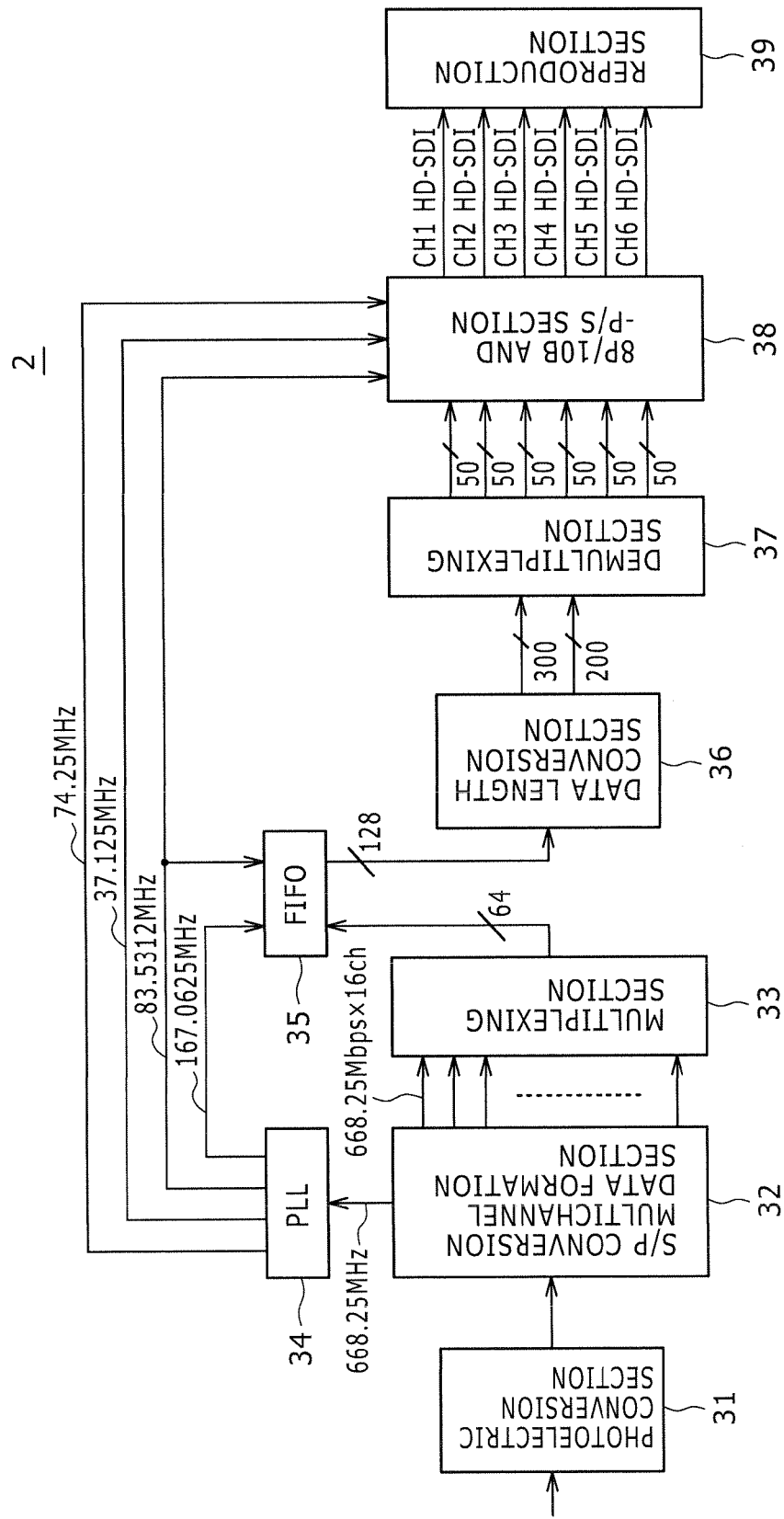
FIG. 11 is a block diagram showing an example of an internal configuration of a signal reception apparatus in the circuit configuration of a CCU shown in FIG. 1.

FIG. 11 shows part of the circuit configuration of the CCU 2 which relates to the present embodiment. The CCU 2 includes a plurality of such circuits which correspond in a one-by-one corresponding relationship to the broadcasting cameras 1.

Serial digital data of the bit rate of 10.692 Gbps transmitted from each broadcasting camera 1 through an optical fiber cable 3 is converted into an electric signal by a photoelectric conversion section 31 and the sent to an S/P conversion multi-channel data formation section 32. The S/P conversion multi-channel data formation section 32 is, for example, an XSBI described hereinabove. The S/P conversion multi-channel data formation section 32 receives first, second, third and fourth sub images to which the image signal is mapped and is each composed of two divisional link channels including the first link channel and the second link channel.

The S/P conversion multi-channel data formation section 32 carries out serial/parallel conversion of the serial digital data of the bit rate of 10.692 Gbps. Then, the S/P conversion multi-channel data formation section 32 forms serial digital data for 16 channels each having the bit rate of 668.25 Mbps from the parallel digital data obtained by the serial/parallel conversion.

The parallel digital data of 16 channels formed by the S/P conversion multi-channel data formation section 32 is sent to a multiplexing section 33. Meanwhile, the clock of 668.25 MHz extracted by the S/P conversion multi-channel data formation section 32 is sent to a PLL 34.

The multiplexing section 33 multiplexes the serial digital data of 16 channels from the S/P conversion multi-channel data formation section 32 to produce parallel digital data of the 64-bit width and sends the parallel digital data to a FIFO memory 35.

The PLL 34 divides the clock of 668.25 MHz from the S/P conversion multi-channel data formation section 32 by four to produce a clock of 167.0625 MHz and sends the clock of 167.0625 MHz as a write clock to the FIFO memory 35.

Further, the PLL 34 divides the clock of 668.25 MHz from the S/P conversion multi-channel data formation section 32 by eight to produce a clock of 83.5312 MHz and sends the clock of 83.5312 MHz as a read clock to the FIFO memory 35. Further, the PLL 34 sends the clock of 83.5312 MHz as a write clock to a FIFO memory in an 8B/10B and P/S section 38.

Further, the PLL 34 divides the clock of 668.25 MHz from the S/P conversion multi-channel data formation section 32 by eighteen to produce a clock of 37.125 MHz and sends the clock of 37.125 MHz as a read clock to the FIFO memory in the 8B/10B and P/S section 38. Further, the PLL 34 sends the clock of 37.125 MHz as a write clock to the FIFO memory in the 8B/10B and P/S section 38.

Further, the PLL 34 divides the clock of 668.25 MHz from the S/P conversion multi-channel data formation section 32 by nine to produce a clock of 74.25 MHz and sends the clock of 74.25 MHz as a read clock to the FIFO memory in the 8B/10B and P/S section 38.

Into the FIFO memory 35, parallel digital data of the 64-bit width from the multiplexing section 33 is written in response to the clock of 167.0625 MHz from the PLL 34. The parallel digital data written in the FIFO memory 35 is read out as parallel digital data of the 128-bit width in response to the clock of 83.5312 MHz from the PLL 34 and sent to a data length conversion section 36.

The data length conversion section 36 is configured using a shift register and converts parallel digital data of the 128-bit width into parallel digital data of the 256-bit width. Then, the data length conversion section 36 detects K28.5 inserted in the timing reference signal SAV or EAV. The data length conversion section 36 thereby discriminates each line period to convert data of the timing reference signal SAV, active line, timing reference signal EAV, line number LN and detection code CRC into data of the 300-bit width. Further, the data length conversion section 36 converts data of the horizontal auxiliary data space, that is, the data of the horizontal auxiliary data space of the channel CH1 obtained by the 8B/10B encoding, into data of the 200-bit width. The parallel digital data of the 300-bit width and the parallel digital data of the 200-bit width obtained by the data length conversion by the data length conversion section 36 are sent to a demultiplexing section 37.

The demultiplexing section 37 demultiplexes parallel digital data of the 300-bit width from the data length conversion section 36 into data of the channels CH1 to CH6 of 50 bits before they are multiplexed by the multiplexing section 14 (FIG. 2) in the broadcasting camera 1. The parallel digital data includes data of the timing reference signal SAV, active line, timing reference signal EAV, line number LN and error detection code CRC. Then, the parallel digital data of the 50-bit width of the channels CH1 to CH6 are set to the 8B/10B and P/S section 38.

Further, the demultiplexing section 37 demultiplexes parallel digital data of the 200-bit width from the data length conversion section 36 into data (refer to FIG. 10) of 50 bits before they are multiplexed by the multiplexing section 14. The parallel digital data includes data of the horizontal auxiliary data space of the channel CH1 which is 8B/10B encoded data. Then, the demultiplexing section 37 sends parallel digital data of the 50-bit width to the 8B/10B and P/S section 38.

Further, the demultiplexing section 37 in the present example carries out the following process in the order of the HD-SDI channel where the image signal includes ANC/audio data. In particular, the demultiplexing section 37 demultiplexes ANC/audio data from the horizontal auxiliary data space of the HD-SDIs of the mode B formed based on the first to fourth sub images.

The 8B/10B and P/S section 38 is formed from eight blocks corresponding in a one-by-one corresponding relationship to the channels CH1 to CH8. The 8B/10B and P/S section 38 in the present example functions as a reception section for receiving first, second, third and fourth sub images to which an image signal is mapped and each of which is divided into a first link channel and a second link channel.

The 8B/10B and P/S section 38 decodes parallel digital data of the channels CH1 to CH6 inputted thereto by 8B/10B decoding to convert them into serial digital data and outputs the serial digital data.

A reproduction section 39 carries out a process reverse to the process (FIG. 3) of the mapping section 11 (FIG. 2) in accordance with the SMPTE 435 for HD-SDI signals of the channels CH1 to CH8 (10G Mode B Link A and 10G Mode B link B) sent thereto from the 8B/10B and P/S section 38. By this process, the reproduction section 39 reproduces a 4096× 2160/23.98 P–30 P/4:4:4, 4:2:2/10-bit, 12-bit signal.

At this time, the reproduction section 39 reproduces first, second, third and fourth sub images from the HD-SDIs 1 to 8 received by the S/P conversion multi-channel data formation section 32. Then, the reproduction section 39 extracts pixel samples disposed in the active period of the first, second, third and fourth sub images two by two pixels. Then, the reproduction section 39 multiplexes pixels disposed in order in one frame of a video signal and sampled out from the disposed samples.

At this time, the reproduction section 39 disposes the samples mapped to the first sub image and the second sub image alternately on an odd-numbered line. Similarly, the reproduction section 39 disposes samples mapped to the third sub image and the fourth sub image alternately on an even-numbered line. Then, the reproduction section 39 samples out, from samples disposed on each line, pixels adjacent the samples and multiplexes resulting pixels.

The 4096×2160/23.98 P–30 P/4:4:4, 4:2:2/10-bit, 12-bit signal reproduced by the reproduction section 39 is outputted from the CCU 2 and sent, for example, to a VTR not shown.

In the present example, the CCU 2 carries out signal processing on the side which receives serial digital data produced by the broadcasting cameras 1. In the signal reception apparatus and the signal reception method, parallel digital data is produced from the serial digital data of the bit rate of 10.692 Gbps, and the parallel digital data is demultiplexed into data of the individual channels.

Figure 12:
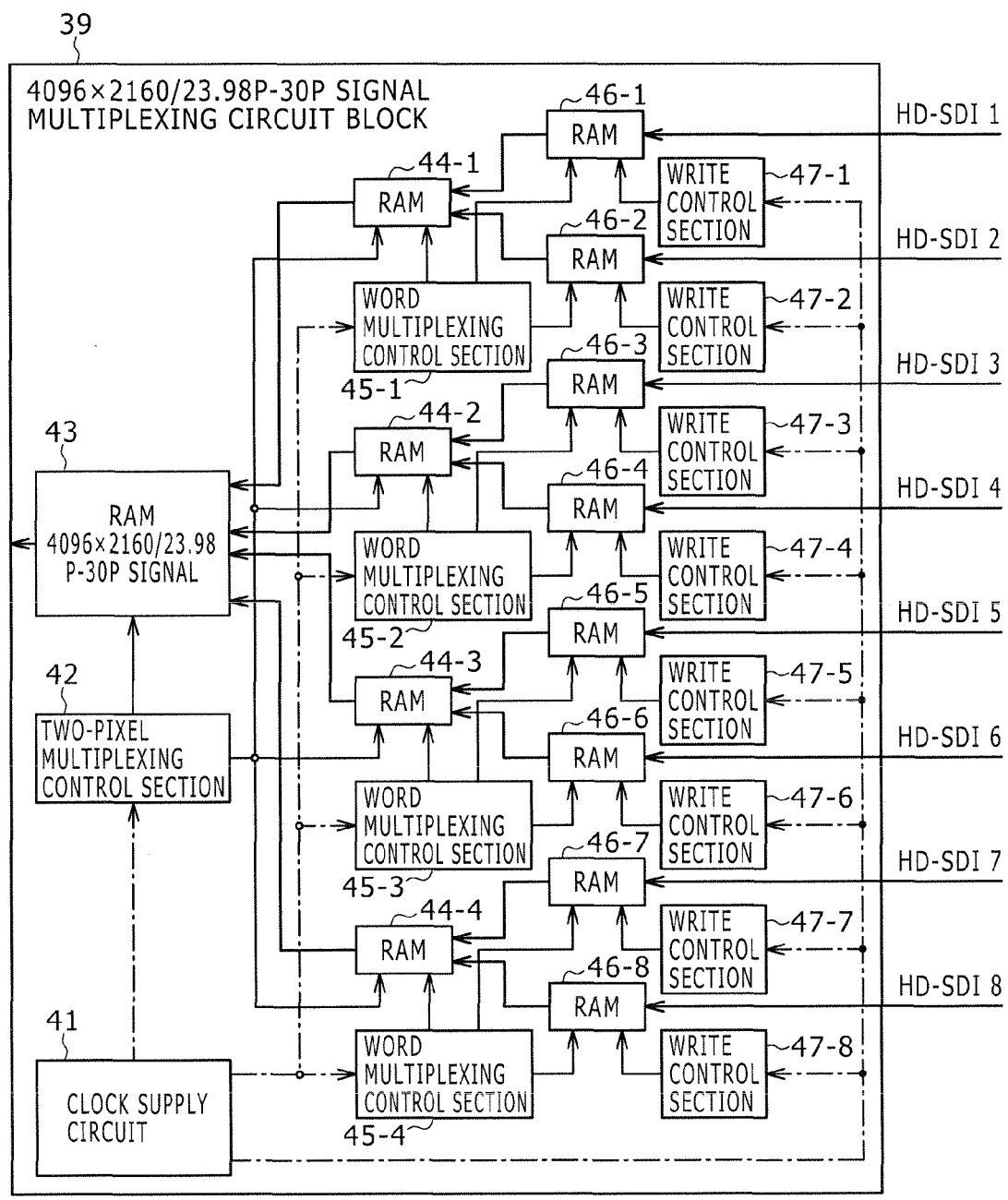
FIG. 12 is a block diagram showing an example of an internal configuration of a reproduction section shown in FIG. 11.

FIG. 12 shows an example of an internal configuration of the reproduction section 39.

The reproduction section 39 is a block for carrying out reverse conversion to the process carried out for pixel samples by the mapping section 11.

The reproduction section 39 includes a clock supplying section 41 for supplying clocks to the associated components. Further, the reproduction section 39 outputs a 4096×2160/ 23.98 P–30 P signal from the 10G mode B link A and 10 G mode B link B.

The reproduction section 39 further includes word multiplexing control sections 45-1 to 45-4 for controlling word multiplexing, and RAMs 44-1 to 44-4 into which data temporarily multiplexed by the word multiplexing control sections 45-1 to 45-4 are written.

The word multiplexing control sections 45-1 to 45-4 multiplexes pixel samples extracted from within the active region of the HD-SDIs of the mode B read out from RAMs 46-1 to 46-8 with first to fourth sub images prescribed by the SMPTE 435-1 for each word. In particular, the word multiplexing control sections 45-1 to 45-4 control the timing for each of the RAMs 46-1 and 46-2, the RAMs 46-3 and 46-4, the RAMs 46-5 and 46-6 and the RAMs 46-7 and 46-8. At this time, the word multiplexing control sections 45-1 to 45-4 read out in a unit of a word of inverse conversion to that of FIGS. 4, 6, 7, 8 and 9 of the SMPTE 372. Then, the word multiplexing control sections 45-1 to 45-4 form first to fourth sub images in the RAMs 44-1 to 44-4, respectively.

Further, the reproduction section 39 includes a two-pixel multiplexing control section 42 for controlling two-pixel multiplexing (deinterleave) of multiplexing pixel samples read out from the RAMs 44-1 to 44-4 two by two pixels into a RAM 43. The two-pixel multiplexing control section 42 multiplexes the pixel samples read out from the RAMs 44-1 to 44-4 by the following process. In particular, the pixel samples read out two by two pixels from the first and second sub images are multiplexed in an adjacent relationship with each other on an odd-numbered line of a frame which is defined by an image signal with regard to which the pixel number of one frame exceeds the pixel number prescribed by the HD-SDI format. Similarly, the pixel samples read out two by two pixels from the third and fourth sub images are multiplexed in an adjacent relationship with each other on an even-numbered line of a frame which is defined by the image signal. Then, the 4096×2160/23.98 P–30 P signal is stored into the RAM 43 and is reproduced suitably.

The clock supplying section 41 supplies a clock to be used for reading out or writing of pixel samples to the two-pixel multiplexing control section 42, word multiplexing control sections 45-1 to 45-4 and write control section 47-1 to 47-8 so that the components are synchronized with each other by the clock.

It is to be noted that, while, in the example illustrated in FIG. 12, word multiplexing and two-pixel multiplexing are carried out by two successive stages using two different RAMs, alternatively a single RAM may be used to produce a 4096×2160/23.98 P–30 P/4:4:4, 4:2:2/10-bit, 12-bit signal.

In the camera transmission system according to the first embodiment described above, two-pixel sampling out and word sampling out for a 4096×2160/23.98 P–30 P/4:4:4, 4:2:2/10-bit, 12-bit signal are carried out. Consequently, each broadcasting camera 1 can convert a 4096×2160/23.98 P–30 P/4:4:4, 4:2:2/10-bit, 12-bit signal into serial digital data of the bit rate of 10.692 Gbps and transmit the serial digital data to the CCU 2.

On the other hand, the CCU 2 can reproduce a 4096×2160/23.98 P–30 P/4:4:4, 4:2:2/10-bit, 12-bit signal from serial digital data of the bit rate of 10.692 Gbps. In short, a 4k×2k signal can be transmitted by multi-channels of a 10.692 Gbps serial interface which is used heretofore. Therefore, upon signal transmission, existing equipments can be utilized effectively.

Further, in the mode B of the SMPTE 435, audio signals of a plurality of channels can be multiplexed into the horizontal auxiliary data space of the channels CH1, CH2, CH3 and CH4. Therefore, the data amount of ANC/audio data which can be transmitted in the mode B can be increased. Further, the mapping section 11 carries out multiplexing of a plurality of channels in the horizontal auxiliary data space of the HD-SDIs with which the audio signals are multiplexed. Particularly, in 23.98 P, 24 P and 25 P, 96 kHz audios prescribed by the SMPTE 428-2 can be multiplexed by 48 channels in the maximum.

Further, by sampling out a 4096×2160 signal for every two pixels, a video image of the entire screen can be observed by an existing monitor for the HD or a waveform monitor, and consequently, an analysis of a fault upon development of video apparatus can be carried out effectively. In addition, by sampling out for every two pixels, a transmission system which causes less delay can be produced.

Further, if a 4k video signal of the next generation is transmitted by HD-SDIs of 1.5 G, then, eight channels are required even with 30 P, and 16 channels are required with 60 P. Although the 3G-SDI decreases the channel number to one half, the transmission channel number is excessively great for optical transmission between a camera and a CCU or for a transmission application between a VTR and a monitor and therefore is not suitable for them. It is desired to develop a 10 G interface which can transmit a 4 k video signal as a 10.692 Gbps serial signal by approximately two or three channels and besides allows use of a light transceiver module on the market. Here, in the case where signals of 10G-SDIs of two channels are transmitted through a single optical fiber, a 1.3 μm/1.55 μm wavelength multiplexing technique can be used. Therefore, there is an effect that a large amount of data can be transmitted efficiently.

Second Embodiment

4096×2160/47.95 P–60 P/4:4:4, 4:2:2/10 Bits, 12 Bits

Now, an example of operation of the mapping section 11 and the reproduction section 39 in the second embodiment of the present invention is described with reference to FIGS. 13 to 17.

Here, a method of sampling out pixel samples of a 4096×2160/47.95 P, 48 P, 50 P, 59.94 P, 60 P/4:4:4, 4:2:2/10 bits, 12 bits is described. In the following description, 47.95 P, 48 P, 50 P, 59.94 P, 60 P is sometimes referred to as "47.95 P–60 P."

Figure 13:
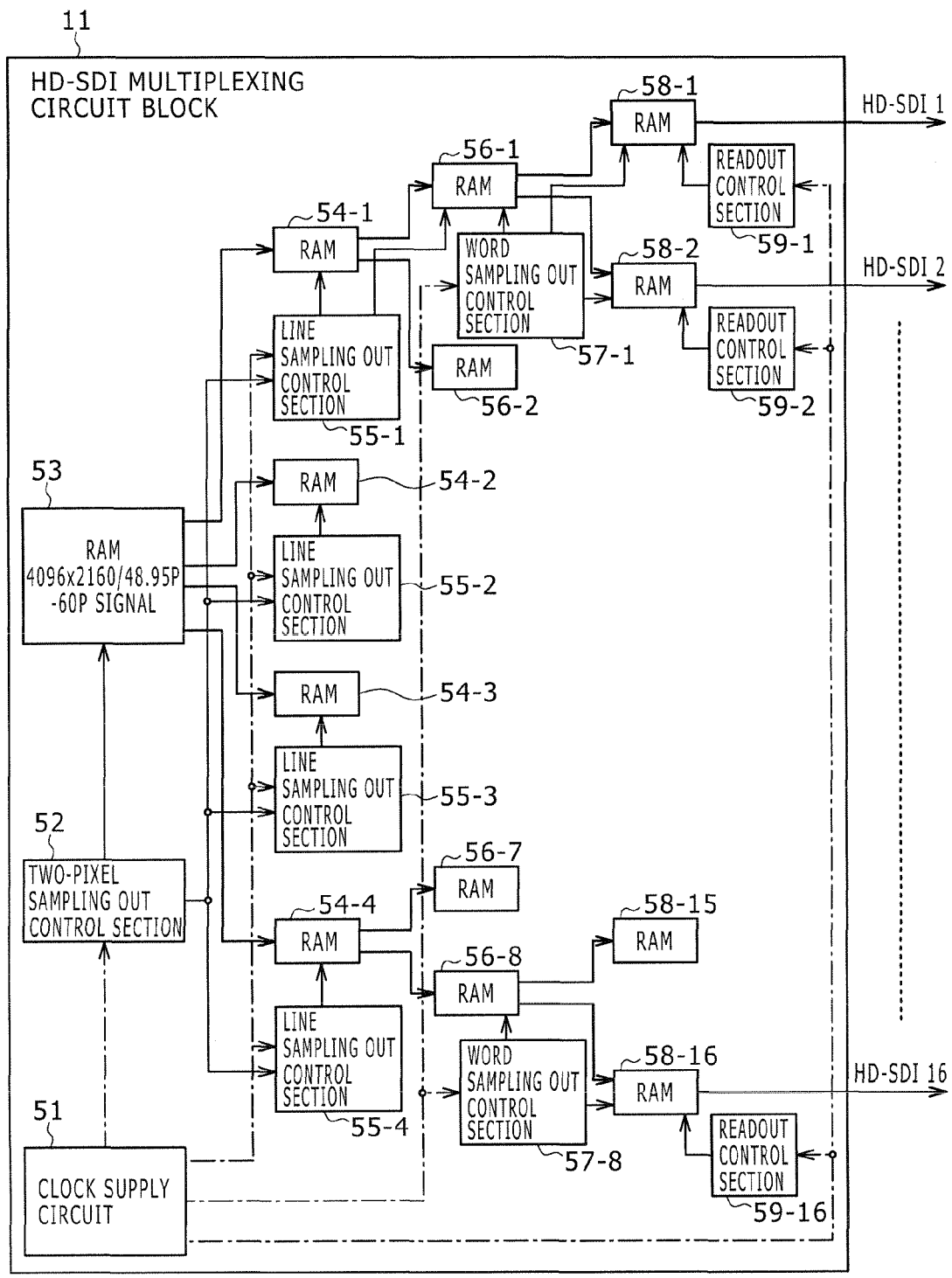
FIG. 13 is a block diagram showing an example of an internal configuration of a mapping section in a circuit configuration of a broadcasting camera according to a second embodiment of the present invention.

FIG. 13 shows an example of an internal configuration of the mapping section 11.

The mapping section 11 includes a clock supplying circuit 51 for supplying clocks to components of the mapping section 11, and a RAM 53 for storing a video signal of 4096×2160/47.95 P–60 P. The mapping section 11 further includes a two-pixel sampling out control section 52 for controlling two-pixel sampling out (interleave) of reading out pixel samples two by two pixels from the RAM 53, and RAMs 54-1 to 54-4 for storing pixel samples after the two-pixel sampling out.

Further, the mapping section 11 includes four line sampling out control sections 55-1 to 55-4 for controlling line sampling out of data read out from the RAMs 54-1 to 54-4. The mapping section 11 further includes eight RAMs 56-1 to 56-8 for storing data sampled out by the line sampling out control sections 55-1 to 55-4.

The mapping section 11 further includes eight word sampling out control sections 57-1 to 57-8 for controlling word sampling out of data read out from the RAMs 56-1 to 56-8. The mapping section 11 further includes 16 RAMs 58-1 to 58-16 for storing data after the sampling out by the word sampling out control sections 57-1 to 57-8.

The mapping section 11 further includes readout control sections 59-1 to 59-16 for outputting pixel samples read out from the RAMs 56-1 to 56-16 as HD-SDIs of 16 channels.

The clock supplying circuit 51 supplies a clock to be used for reading out or writing of pixel samples to the two-pixel sampling out control section 52, line sampling out control sections 55-1 to 55-4, word sampling out control sections 57-1 to 57-8 and readout control sections 59-1 to 59-16. The blocks mentioned are synchronized with each other by the clock supplied from the clock supplying circuit 51.

A 4096×2160/47.95 P–60 P signal inputted from an image sensor not shown is stored into the RAM 53. The two-pixel sampling out control section 52 extracts, for each two upper and lower lines adjacent each other, pixel samples two by two pixels in a line direction from the RAM 53 and stores the extracted pixels into the RAMs 54-1 to 54-4. Consequently, the two-pixel sampling out control section 52 forms first to fourth sub images prescribed by the SMPTE 435-1 in the RAMs 54-1 to 54-4, respectively.

The line sampling out control sections 55-1 to 55-4 read out the first to fourth sub images mapped by the two-pixel sampling out control section 52 and stored in the RAMs 54-1 to 54-4 for every other line and stores the read out first to fourth sub images into the RAMs 56-1 to 56-8.

The word sampling out control sections 57-1 to 57-8 sample out the pixel samples sampled out for every other line and stored in the RAMs 56-1 to 56-8 for every word by a method same as that of FIGS. 4, 6, 7, 8 and 9 of the SMPTE 372 to read out the pixel samples. Then, the word sampling out control sections 57-1 to 57-8 convert the read out pixel samples individually into 2048×1080/47.95I–60I/4:2:2/10-bit signals of two channels and store the resulting signals into the RAMs 58-1 to 58-16. Thereafter, the readout control sections 59-1 to 59-16 read out the pixel samples from the RAMs 58-1 to 58-16 with a reference clock supplied thereto from the clock supplying circuit 51. Then, the readout control sections 59-1 to 59-16 carry out P/S conversion of the pixel samples and map the first to fourth sub images to the HD-SDIs of 16 channels defined by the mode B. Then, the readout control sections 59-1 to 59-16 output the HD-SDIs 1 to 8 of 16 channels wherein two links A and B are configured from four pairs to the S/P·8B/10B section 12 at the succeeding stage.

It is to be noted that, in the present example, in order to carry out two-pixel sampling out, line sampling out and word sampling out, three different kinds of memories, that is, the RAMs 54-1 to 54-4, RAMs 56-1 to 56-8 and RAMs 58-1 to 58-16, are used. However, a single memory may be used to carry out line sampling out and word sampling out of data obtained by two-pixel sampling out to output HD-SDIs of 16 channels.

Figure 14:
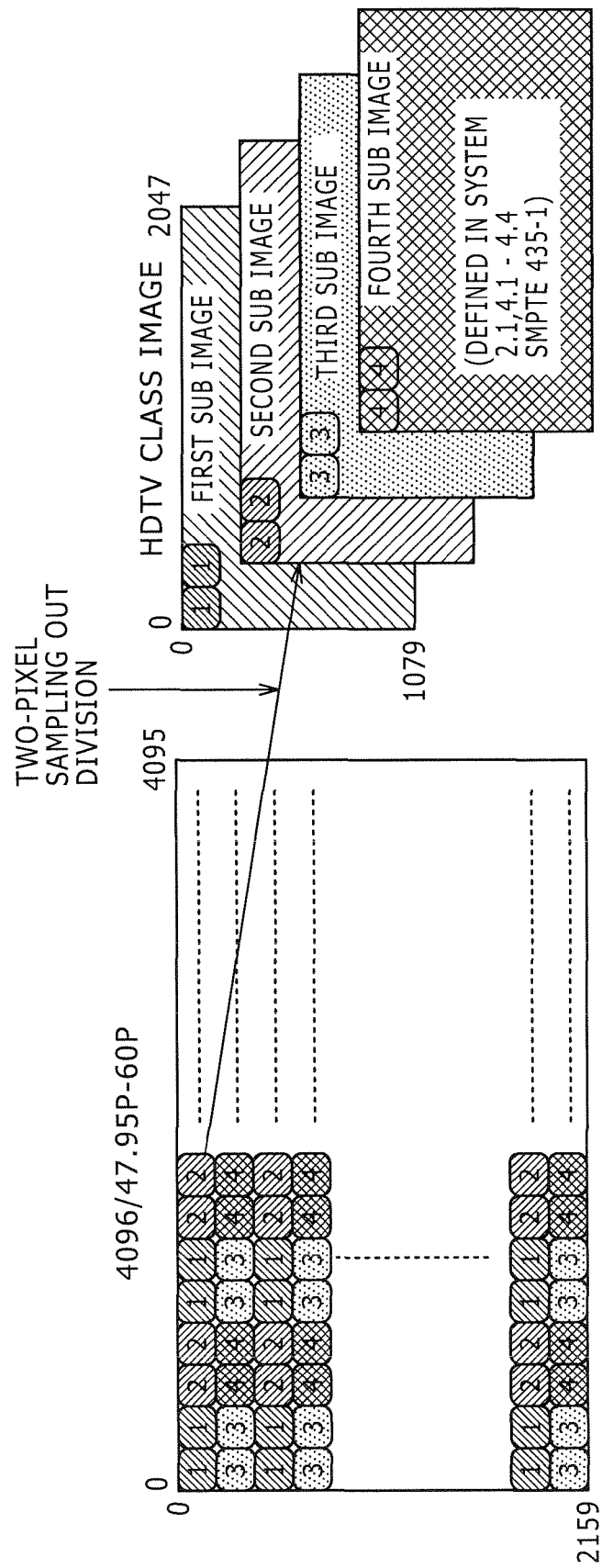
FIG. 14 is a diagrammatic view illustrating processing by the mapping section of FIG. 13 when it maps pixel samples.

FIG. 14 illustrates an example of processing by the mapping section 11 to map pixel samples.

The mapping section 11 samples out pixel samples of 4096×2160/47.95 P–60 P/4:4:4, 4:2:2/10 bits, 12 bits for every two pixels in a line direction. Then, the mapping section 11 maps the pixel samples after the two-pixel sampling out to 2048×1080/47.95 P–60 P/4:4:4, 4:2:2/10-bits, 12-bits of four channels as seen in FIG. 13.

Figure 15:
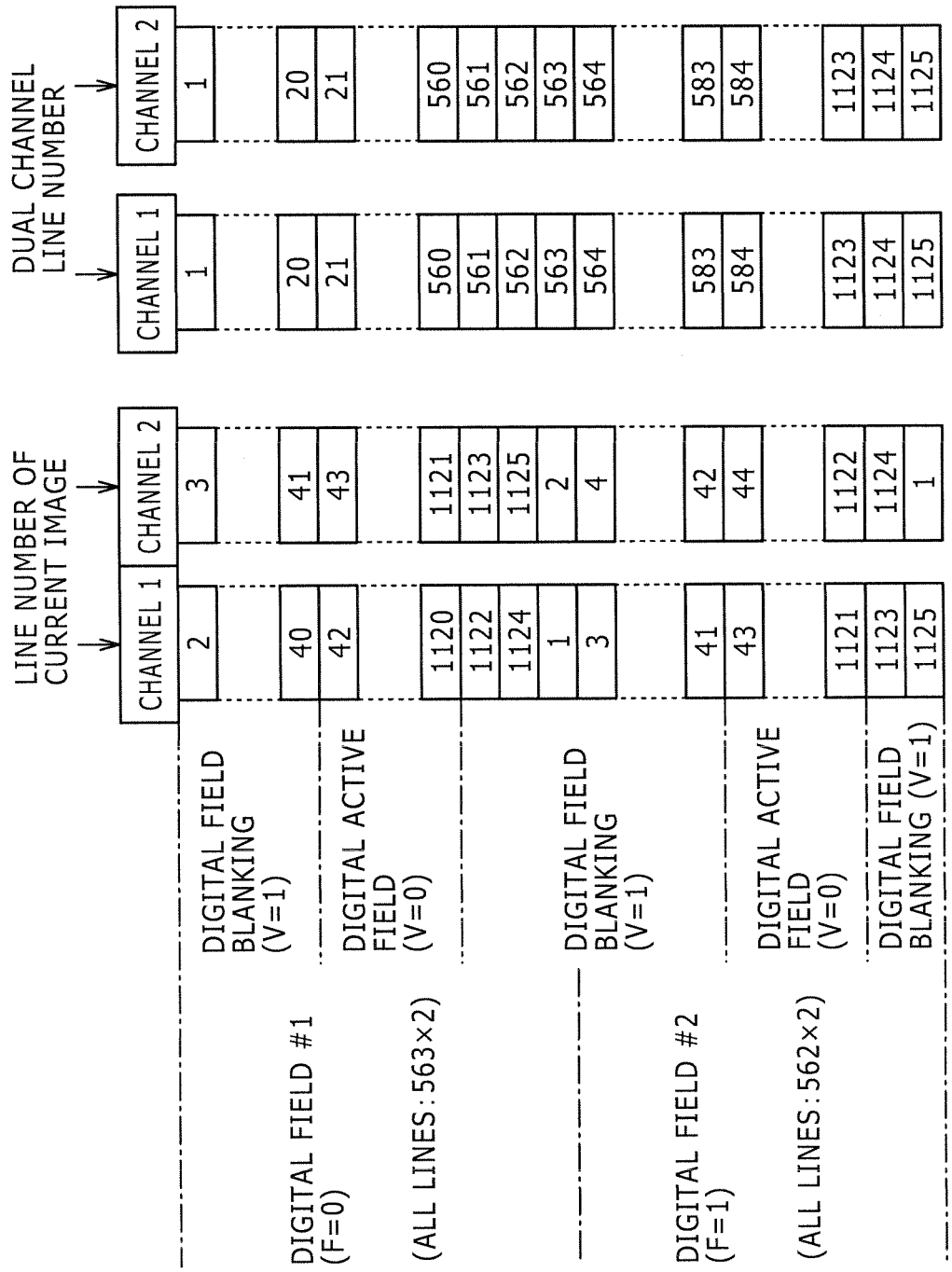
FIG. 15 is a diagrammatic view illustrating an example of line sampling out by the mapping section of FIG. 13.

FIG. 15 illustrates an example of line sampling out.

Here, line sampling out is described using an example of a line number of a dual link interface and a package.

First, the line sampling out control sections 55-1 to 55-4 carries out line sampling out of 2048×1080/47.95 P–60 P/4:4:4, 4:2:2/10-bit, 12-bit signals into channels 1 and 2. Consequently, the line sampled out signals are converted into signals of two channels corresponding to 2048×1080/47.95I, 48I, 50I, 59.94I, 60I/4:4:4, 4:2:2/10-bits, 12-bits.

Figure 16:
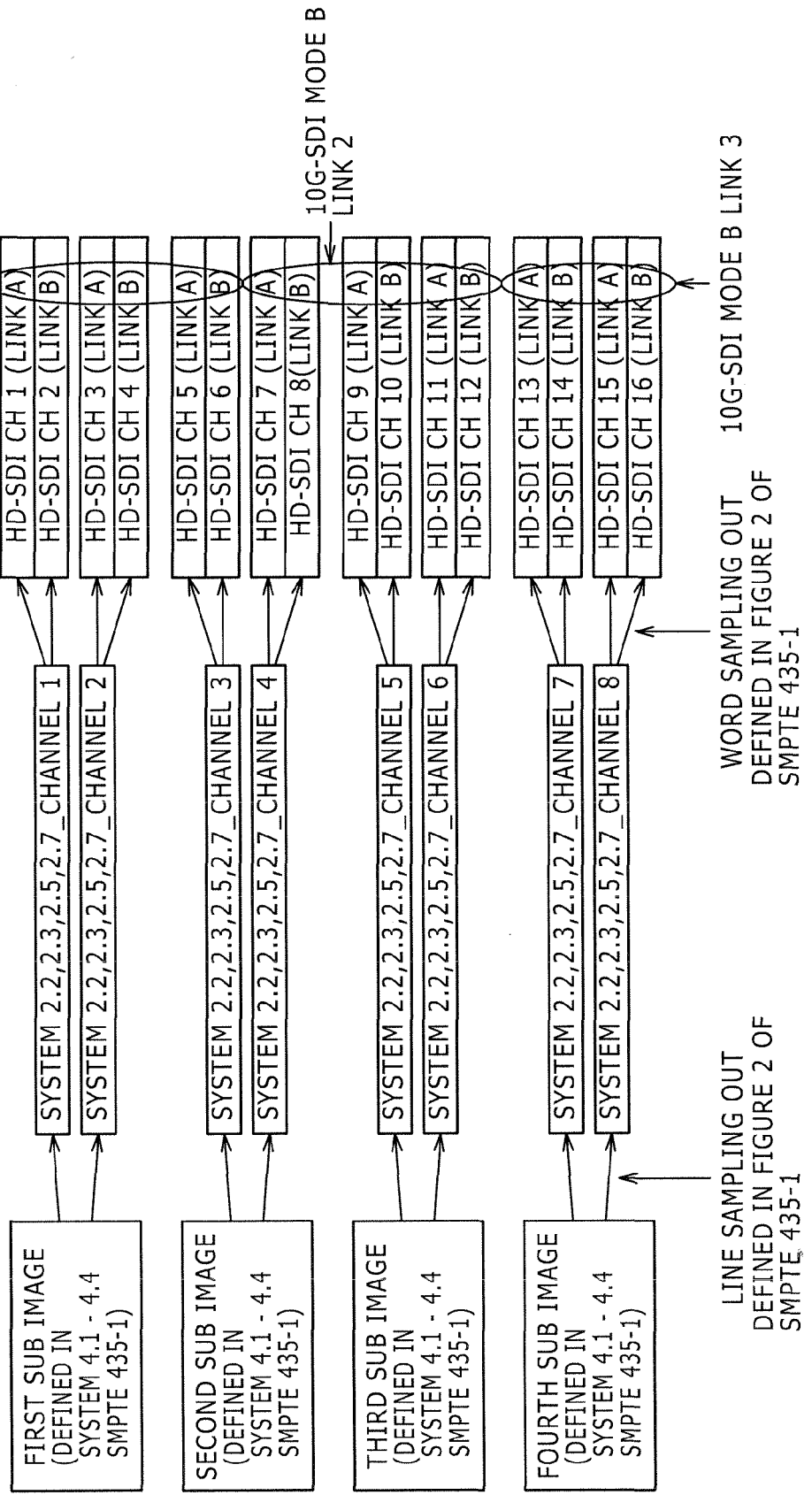
FIG. 16 is a diagrammatic view illustrating an example of line sampling out and word sampling out by the mapping section of FIG. 13.

FIG. 16 illustrates an outline of line sampling out and word sampling out.

Line sampling out of each of first to fourth sub images into signals of two channels is described hereinabove with reference to FIG. 15.

The word sampling out control sections 57-1 to 57-8 sample out signals after line sampling out for each word by a method same as the method of FIGS. 4, 6, 7, 8 and 9 of the SMPTE 372 to map them to links A and B. As a result, the signals mapped to the first to fourth sub images are mapped to HD-SDIs of totaling 16 channels.

Here, the channels CH1 to CH6 are allocated to the first to sixth channels of HD-SDIs of the 10G-SDI mode B prescribed by the S435-2 to form a link 1 of the 10G-SDI.

The channels CH7 to CH12 are allocated to the HD-SDI first to sixth channels of the 10G-SDI mode B to form a link 2 of the 10G-SDI.

The channels CH13 to CH16 are allocated to the HD-SDI first to fourth channels of the 10G-SDI mode B to form a link 3 of the 10G-SDI.

Further, if 4096×2160 signals include ANC/audio data, then the multiplexing section 14 multiplexes the ANC/audio data in the horizontal auxiliary data space of the HD-SDIs. In particular, in the case of 60 P, the ANC/audio data are multiplexed in the order of the HD-SDI channels CH1 and CH2 of the 10G-SDI link 1, the HD-SDI channels CH1 and CH2 of the 10G-SDI link 2 and the HD-SDI channels CH1 and CH2 of the 10G-SDI link 3.

Or, in the case of 47.95 P to 50 P, the ANC/audio data are multiplexed successively. For example, the ANC/audio data are multiplexed in the order of the HD-SDI channels CH1, CH2, CH3 and CH4 of the 10G-SDI link 1, HD-SDI channels CH1, CH2, CH3 and CH4 of the 10G-SDI link 2 and the HD-SDI channels CH1, CH2, CH3 and CH4 of the 10G-SDI link 3. At this time, even if the ANC/audio data of the HD-SDI channel CH1 of the 10G-SDI link 1 is used up to a permissible amount, audio data may still have to be multiplexed in the auxiliary data space. Only in this instance, the H blank of the 10G-SDI link 1 HD-SDI channel CH2 is used.

Here, 48 kHz sampling audios can be transmitted by the channel number described below in the maximum.

In particular, in the case of 60 P, 48 kHz sampling audios can be transmitted by 16 channels×2 channels×3 links=96 channels in the maximum, and 96 kHz sampling audios can be transmitted by 48 channels which are one half of 96 channels.

On the other hand, in the case of 47.95 P to 50 P, 48 kHz sampling audios can be transmitted by 16 channels×4 channels×3 links=192 channels, and 96 Hz sampling audios can be transmitted by 96 channels which are one half of 192 channels.

Figure 17:
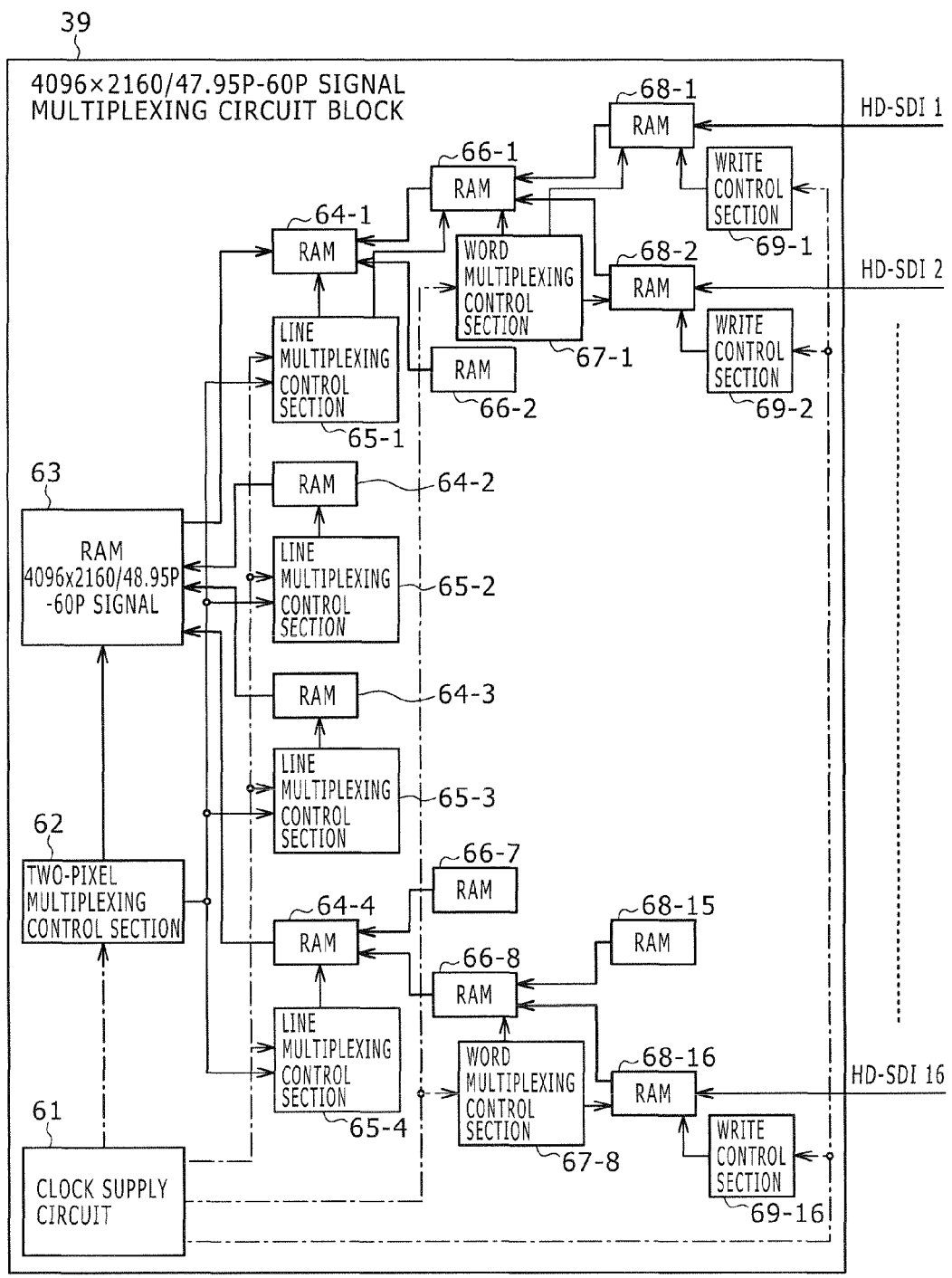
FIG. 17 is a block diagram showing an example of an internal configuration of a reproduction section in a circuit configuration of a CCU according to the second embodiment of the present invention.

FIG. 17 shows an example of an internal configuration of the reproduction section 39 of the CCU 2.

The reproduction section 39 includes a clock supplying circuit 61 for supplying clocks to components of the reproduction section 39, and a RAM 63 for storing a video signal of 4096×2160/47.95 P–60 P. The reproduction section 39 further includes RAMs 68-1 to 68-16 for storing 16 HD-SDIs 1 to 16 defined by the mode B, respectively. The HD-SDIs 1 to 16 are each configured from a 2048×1080/47.95I, 48I, 50I, 59.94I, 60I/4:2:2/10-bits signal.

The HD-SDIs 1 to 16 are HD-SDIs 1 to 16 inputted from the 8B/10B and P/S sections 38 of the 10G mode B links 1, 2 and 3. Write control sections 69-1 to 69-16 carry out writing control of the 16 HD-SDIs 1 to 16 inputted thereto in synchronism with a clock supplied thereto from the clock supplying circuit 61.

The reproduction section 39 further includes word multiplexing control section 67-1 to 67-8 for controlling word multiplexing, and RAMs 66-1 to 66-8 into which data temporarily multiplexed by the word multiplexing control section 67-1 to 67-8 are written, respectively. The word multiplexing control section 67-1 to 67-8 control a predetermined timing to read out the data in the RAMs 66-1 to 66-8 in a unit of a word of inverse conversion of FIGS. 4, 6, 7, 8 and 9 of the SMPTE 372. The readout timing is determined for the RAMS 68-1 and 68-2, RAMS 68-3 and 68-4, RAMS 68-5 and 68-6 and RAMS 68-7 and 68-8.

The reproduction section 39 further includes line multiplexing control sections 65-1 to 65-4 for multiplexing pixel samples multiplexed by the word multiplexing control section 67-1 to 67-8 for each one line of first to fourth sub images. In particular, the line multiplexing control sections 65-1 to 65-4 read out pixel samples from the RAMs 66-1 to 66-8 and multiplex the pixel samples for each line and then write the multiplexed data into RAMs 64-1 to 64-4. Then, the line multiplexing control sections 65-1 to 65-4 form first to fourth sub images prescribed by the SMPTE 435-1 in the RAMs 64-1 to 64-4, respectively.

The reproduction section 39 further includes a two-pixel multiplexing control section 42 provided in the RAM 43 for controlling two-pixel multiplexing (deinterleave) of multiplexing pixels for each two pixels. A 4096×2160/47.95 P–60 P signal is stored in the RAM 43 and is reproduced suitably.

The clock supplying section 41 supplies a clock to be used for reading out or writing of pixel samples to the two-pixel multiplexing control section 42, word multiplexing control section 67-1 to 67-8 and write control sections 69-1 to 69-16 so that the components may be synchronized with each other by the clock.

It is to be noted that, while, in the example illustrated in FIG. 12, word multiplexing, line multiplexing and two-pixel multiplexing are carried out by three stages using three different RAMs, alternatively a single RAM may be used to produce a 4096×2160/47.95 P–60 P/4:4:4, 4:2:2/10-bit, 12-bit signal.

With the second embodiment described above, the mapping section 11 samples out pixel samples of a 4096×2160/47.95 P–60 P/4:4:4, 4:2:2/10-bit, 12-bit signal to map the pixel samples to first to fourth sub images. Thereafter, the mapping section 11 carries out line sampling out and word sampling out, and consequently, resulting signals can be transmitted to first, second and third links configured from six channels of the 10G-SDI mode B. Therefore, the broadcasting cameras 1 can convert 4096×2160/47.95 P–60 P/4:4:4, 4:2:2/10-bit, 12-bit signals into and transmit serial digital data of the bit rate of 10.692 Gbps to the CCU 2.

On the other hand, the CCU 2 can reproduce a 4096×2160/47.95 P–60 P/4:4:4, 4:2:2/10-bit, 12-bit signal from serial digital data of the bit rate of 10.692 Gbps. In other words, a 4k×2k signal can be transmitted by multi-channels of a 10.692 Gbps serial interface which is used heretofore. Therefore, upon signal transmission, existing equipments can be utilized effectively.

When signals of 10G-SDI 3 channels are to be transmitted by a single optical fiber, a CWDM/DWDM wavelength multiplexing technique can be used.

Third Embodiment

Mapping Control of Pixel Samples: Example of 4096×2160/71.928 P–90 P/4:4:4, 4:2:2/10 Bits, 12 Bits Now, an example of operation of the mapping section 11 and the reproduction section 39 in the third embodiment of the present invention is described with reference to FIGS. 18 to 21.

The present embodiment is an example wherein the present invention is applied to a signal transmission apparatus which separates an image signal inputted at an n-speed for each n frames and transmitted in the 10G-SDI mode B.

In the following description, a method of sampling out pixel samples of a 4096×2160/71.928 P, 72 P, 75 P, 89.91 P, 90 P/10 bits, 12 bits is described. In the following description, 71.928 P, 72 P, 75 P, 89.91 P, 90 P is sometimes referred to simply as "71.928 P–90 P."

Figure 18:
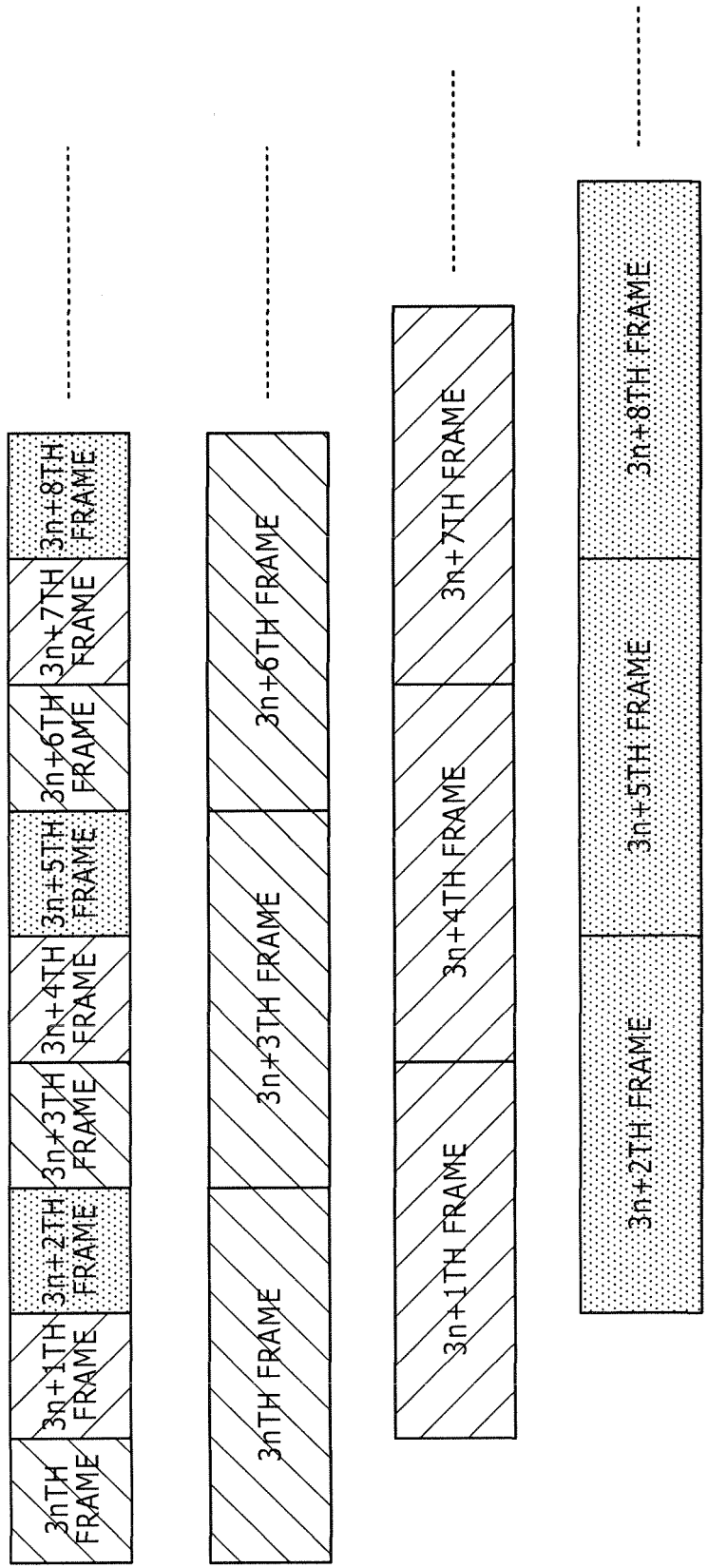
FIG. 18 is a diagrammatic view illustrating an example of frame sampling out in the case where a 4096×2160 signal is a three-speed signal according to a third embodiment of the present invention.

FIG. 18 illustrates an example of frame sampling out in the case where a 4096×2160 signal is a three-speed signal.

If an n-speed signal (in the present example, n=3) is inputted, then the mapping section 11 extracts the input signal for every three frames and carries out a predetermined conversion process based on the input signal.

The mapping section 11 samples out the 4096×2160/71.928 P–90 P/4:4:4, 4:2:2/10-bit, 12-bit signal for every three frames using a frame memory. Then, the mapping section 11 produces 4096×2160/23.98 P–30 P/4:4:4, 4:2:2/10-bit, 12-bit signals of three channels.

Then, the mapping section 11 maps the 4096×2160/23.98 P–30 P/4:4:4, 4:2:2/10-bit, 12-bit signals to HD-SDIs of eight channels by the method described hereinabove in connection with the first embodiment. Consequently, the mapping section 11 outputs the HD-SDIs of 24 channels.

Figure 19:
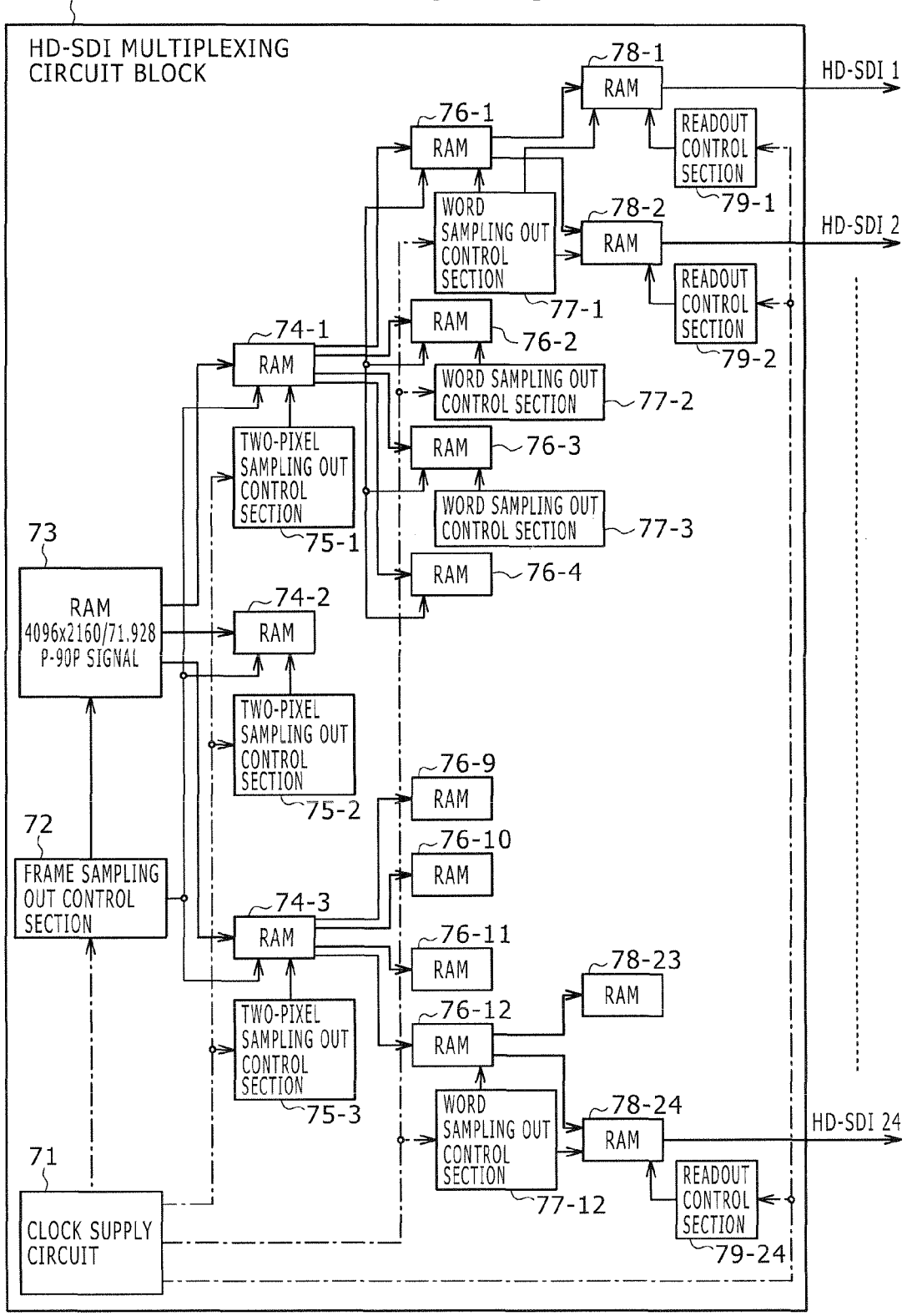
FIG. 19 is a block diagram showing an example of an internal configuration of a mapping section in a circuit configuration of a broadcasting camera according to the third embodiment of the present invention.

FIG. 19 shows an example of an internal configuration of the mapping section 11.

The mapping section 11 includes a clock supplying circuit 71 for supplying a clock to the components of the mapping section 11, and a RAM 73 for storing a video signal of 4096×2160/71.928 P–90 P. Further, the mapping section 11 includes a frame sampling out control section 72 for controlling frame sampling out (interleave) of reading out pixel samples for each one frame from the RAM 73, and RAMs 74-1 to 74-3 for storing the pixel samples after the frame sampling out.

The mapping section 11 further includes two-pixel sampling out control sections 75-1 to 75-3 for controlling two-pixel sampling out of reading out pixel samples two by two pixels from the RAMs 74-1 to 74-3, and RAMs 76-1 to 76-12 for storing the pixel samples after the two-pixel sampling out.

The mapping section 11 further includes 12 word sampling out control sections 77-1 to 77-12 for controlling word sampling out of data read out from the RAMs 76-1 to 76-12. Further, the mapping section 11 includes 24 RAMs 78-1 to 78-24 for storing data after sampling out by the word sampling out control sections 77-1 to 77-12.

The mapping section 11 further includes readout control sections 79-1 to 79-24 for outputting pixel samples read out from the RAMs 78-1 to 78-24 as HD-SDIs of 24 channels, respectively.

The clock supplying circuit 71 supplies a clock to be used for reading out or writing of pixel samples to the frame sampling out control section 72, two-pixel sampling out control sections 75-1 to 75-3, word sampling out control sections 77-1 to 77-12 and readout control sections 79-1 to 79-24. The blocks mentioned are synchronized with each other by the clock supplied thereto from the clock supplying circuit 71.

A 4096×2160/71.928 P–90 P signal inputted from the image sensor not shown is stored into the RAM 73. If the inputted image signal is an n-speed signal, then the frame sampling out control section 72 samples out image samples for every n frames to produce signals of n channels. In the present example, since the input signal is a three-speed signal, 4096×2160/23.98 P–30 P signals formed by sampling out one frame for every three frames are stored into the RAMs 74-1 to 74-3.

The two-pixel sampling out control sections 75-1 to 75-3 map the pixel samples sampled out to the n-channel signals two by two pixels to first to fourth sub images. In particular, the two-pixel sampling out control sections 75-1 to 75-3 extract pixel samples two by two pixels in a line direction for each two upper and lower lines adjacent each other from the 4096×2160/23.98 P–30 P signals read out from the RAMs 74-1 to 74-3. Thereafter, the two-pixel sampling out control sections 75-1 to 75-3 store the extracted pixel samples into the RAMs 76-1 to 76-12. The two-pixel sampling out control sections 75-1 to 75-3 thereby form first to fourth sub images prescribed by the SMPTE 435-1 in the RAMs 76-1 to 76-4, 76-5 to 76-8 and 76-9 to 76-12, respectively.

The word sampling out control sections 77-1 to 77-24 carry out word sampling out of the first to fourth sub images stored in the RAMs 76-1 to 76-12 to convert the first to fourth sub images into 2048×1080/23.98 P–30 P/4:2:2/10-bit signals of two channels. Then, the word sampling out control sections 77-1 to 77-24 store the 2048×1080/23.98 P–30 P/4:2:2/10-bit signals of two channels into the RAMs 78-1 to 78-24. The readout control sections 79-1 to 79-24 read out signals with the reference clock supplied thereto from the clock supplying circuit 71, carry out P/S conversion of the signals, map the resulting signals to the HD-SDIs of totaling 24 channels and output the resulting HD-SDIs of 24 channels.

Figure 20:
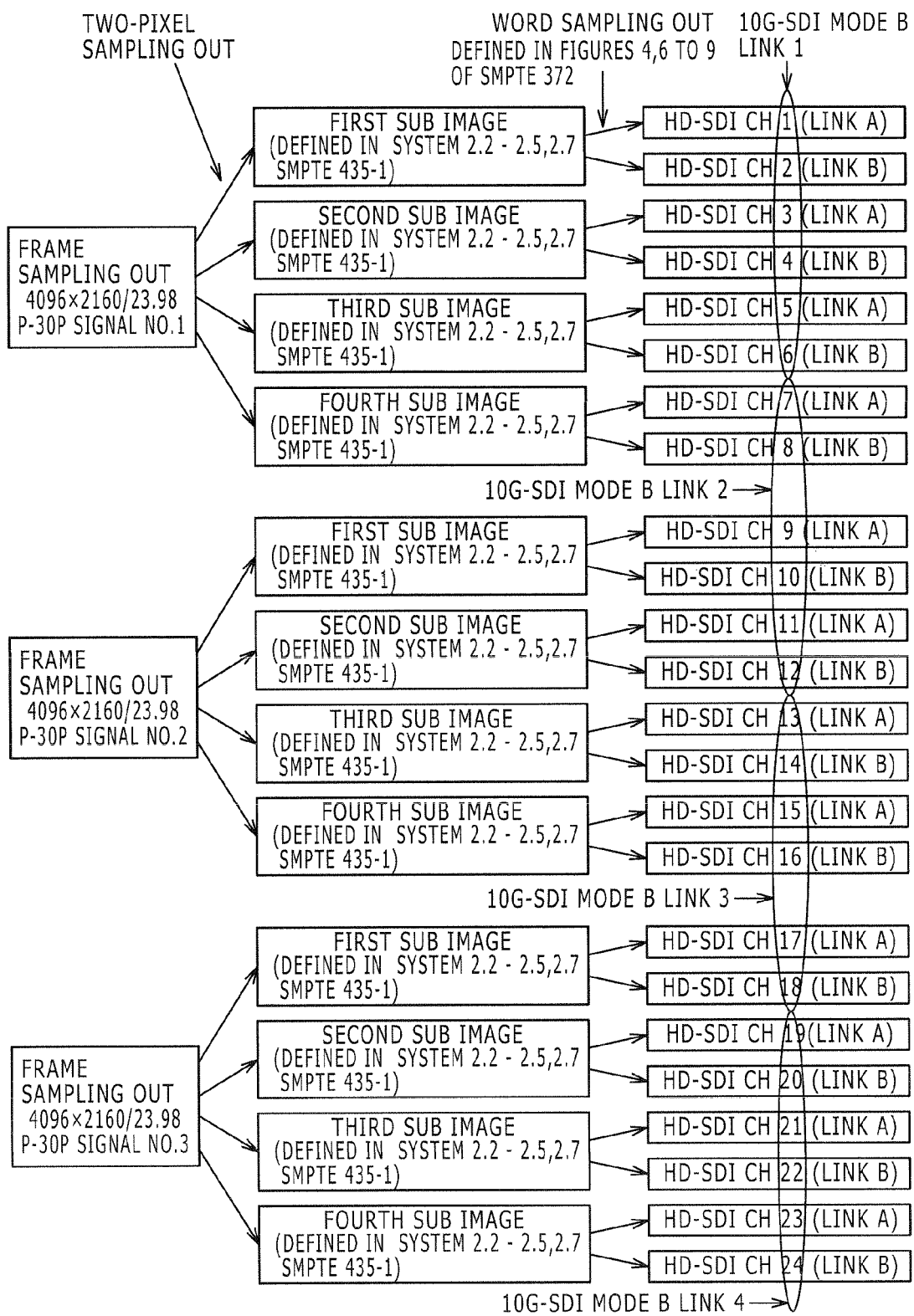
FIG. 20 is a diagrammatic view illustrating an example wherein signals obtained by frame sampling out are mapped to an active period of HD-SDIs of 24 channels according to the third embodiment of the present invention.

FIG. 20 illustrates an example of mapping of frame-sampled out signals to the active period of the HD-SDIs of 24 channels.

First, the two-pixel sampling out control section 22 maps pixel samples two by two pixels to the first to fourth sub images from the three frames after the frame sampling out. Then, the word sampling out control sections 25-1 to 25-4 map the pixel samples read out from the first to fourth sub images to the links A and B. Thus, the word sampling out control sections 25-1 to 25-4 map the pixel samples to the HD-SDIs of totaling 24 channels.

Here, the channels CH1 to CH6 are allocated to the HD-SDI first to sixth channels of the 10G-SDI mode B prescribed by the S435-2 to form a 10G-SDI link 1.

The channels CH7 to CH12 are allocated to the HD-SDI first to sixth channels of the 10G-SDI mode B to form a 10G-SDI link 2.

The channels CH13 to CH18 are allocated to the HD-SDI first to sixth channels of the 10G-SDI mode B to form a 10G-SDI link 3.

The channels CH19 to CH24 are allocated to the HD-SDI first to sixth channels of the 10G-SDI mode B to form a 10G-SDI link 4.

Further, as described in connection with the first embodiment, if 4096×2160 signals include ANC/audio data, then the multiplexing section 14 multiplexes the ANC/audio data into the horizontal auxiliary data space of the HD-SDIs.

In the case of 90 P, the ANC/audio data are multiplexed in the order of the HD-SDI channels CH1 and CH2 of the 10G-SDI link 1, the HD-SDI channels CH1 and CH2 of the 10G-SDI link 2 and the HD-SDI channels CH1 and CH2 of the 10G-SDI link 3.

Or, in the case of 71.928 P to 75 P, the ANC/audio data are multiplexed in the following order. In particular, the ANC/audio data are multiplexed in the order of the HD-SDI channels CH1, CH2, CH3 and CH4 of the 10G-SDI link 1, HD-SDI channels CH1, CH2, CH3 and CH4 of the 10G-SDI link 2 and the HD-SDI channels CH1, CH2, CH3 and CH4 of the 10G-SDI link 3.

At this time, even if the ANC/audio data region of the HD-SDI channel CH1 of the 10G-SDI link 1 is used up to a permissible amount, only if it is necessary to still multiplex ANC/audio data, the H blank of the 10G-SDI link 1 HD-SDI channel CH2 is used.

Here, 48 kHz sampling audios can be transmitted by the channel number described below in the maximum.

In particular, in the case of 90 P, 48 kHz sampling audios can be transmitted by 16 channels×2 channels×4 links=128 channels, and 96 kHz sampling audios can be transmitted by 64 channels which are one half of 128 channels.

On the other hand, in the case of 71.928 P to 75 P, 48 kHz sampling audios can be transmitted by 16 channels×4 channels×4 links=256 channels, and 96 kHz sampling audios can be transmitted by 128 channels which are one half of 256 channels.

It is to be noted that, while, in the example illustrated in FIG. 12, frame sampling out, two-pixel sampling out and word sampling out are carried out by three stages using three different RAMs ((RAMs 89-1, 89-2), (RAMs 89-3, 89-4), (RAMs 89-5, 89-6), (RAMs 89-7, 89-8)), alternatively a single RAM may be used to produce a 4096×2160/47.95 P–60 P/4:4:4, 4:2:2/10-bit, 12-bit signal.

Figure 21:
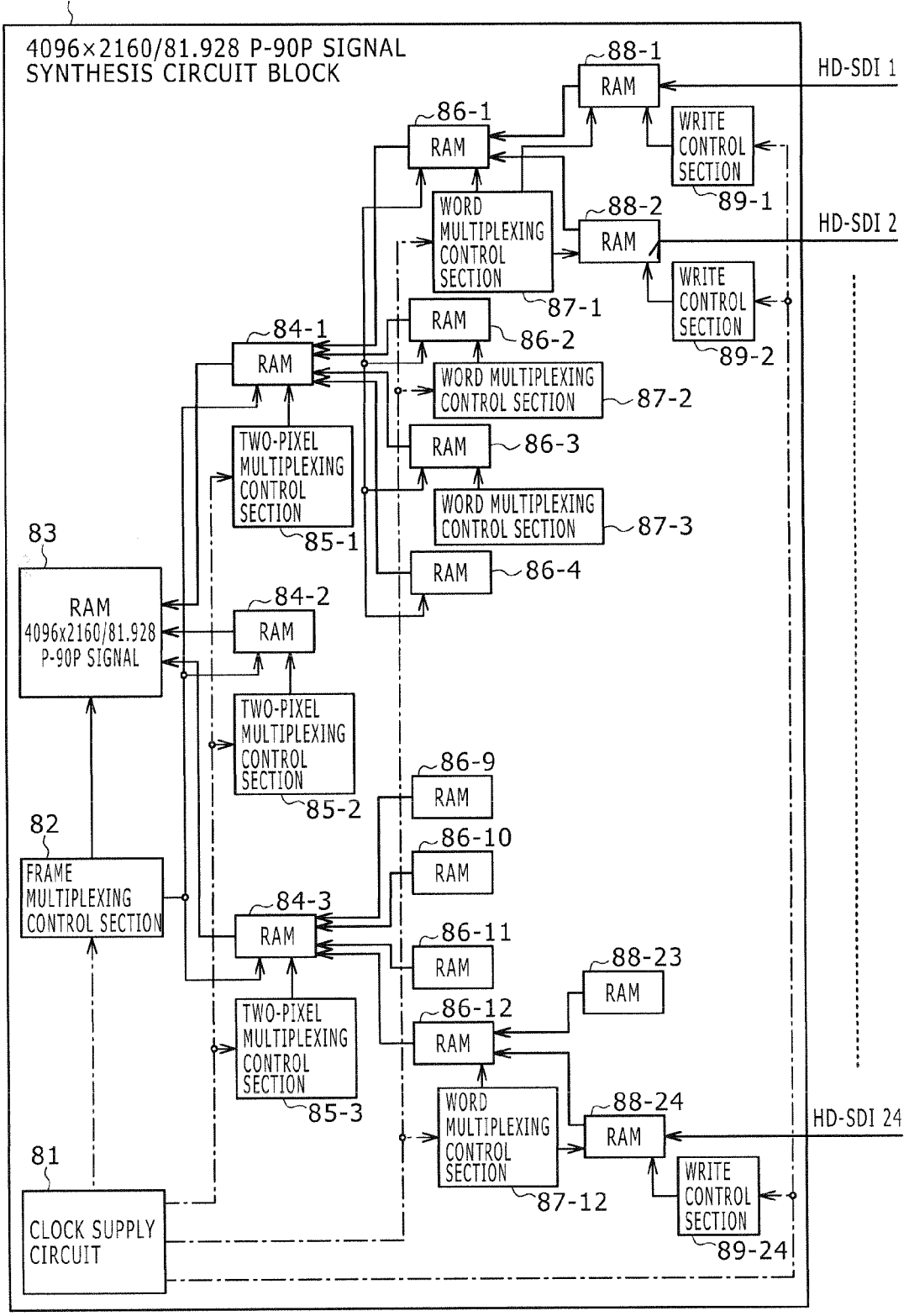
FIG. 21 is a block diagram showing an example of an internal configuration of a mapping section in the circuit configuration of a CCU according to the third embodiment of the present invention.

FIG. 21 shows an internal configuration of the reproduction section 39 of the CCU 2.

The reproduction section 39 includes a clock supplying circuit 81 for supplying a clock to the components of the reproduction section 39, and a RAM 83 for storing a video signal of 4096×2160/71.928 P–90 P. The reproduction section 39 further includes RAMs 89-1 to 89-24 for storing 24 HD-SDIs 1 to 24 prescribed by the mode B. The HD-SDIs 1 to 24 are each configured from a 2048×1080/47.95I, 48I, 50I, 59.94I, 60I/4:2:2/10-bit signal.

The reproduction section 39 further includes word multiplexing control sections 87-1 to 87-12 for controlling word multiplexing, and RAMs 86-1 to 86-12 into which data temporarily multiplexed by the word multiplexing control sections 87-1 to 87-12 are written. The word multiplexing control sections 87-1 to 87-12 control predetermined timings to read out data in a unit of a word of inverse conversion of FIGS. 4, 6, 7, 8 and 9 of the SMPTE 372. The readout timings are determined individually for the RAMs 86-1 and 86-2, RAMs 86-3 and 86-4, RAMs 86-5 and 86-6, and RAMs 86-7 and 86-8. Then, the word multiplexing control sections 87-1 to 87-12 form first to fourth sub images prescribed by the SMPTE 435-1 in the RAMs 86-1 to 86-12.

The reproduction section 39 further includes two-multiplexing control sections 85-1 to 85-3 for multiplexing pixel samples read out from the RAMs 86-1 to 86-12 for every two pixels, and RAMs 84-1 to 84-3 into which the data multiplexed by the two-pixel multiplexing control sections 85-1 to 85-3. The two-pixel multiplexing control sections 85-1 to 85-3 read out the pixel samples two by two pixels from the RAMs 86-1 to 86-12 to reproduce signals corresponding to 4096×2160/23.98 P–30 P.

The reproduction section 39 further includes a frame multiplexing control section 82 for multiplexing pixel samples read out from the RAMs 84-1 to 84-3 for every frame. The frame multiplexing control section 82 is used where an image signal whose pixel number of 1 frame exceeds the number of pixels defined by the HD-SDI format is an n-speed signal. In particular, the frame multiplexing control section 82 multiplexes an image signal formed by the two-pixel multiplexing control sections 85-1 to 85-3 multiplexing pixel samples two by two pixels to produce an n-speed signal. Into the RAM 83, a 4096×2160/71.928 P–90 P/4:4:4, 4:2:2/10-bit, 12-bit signal is stored, and this signal is reproduced suitably.

The clock supplying section 41 supplies a clock for reading out or writing of pixel samples to the word multiplexing control sections 87-1 to 87-12 and the RAMs 89-1 to 89-24, and the components are synchronized with each other by the clock.

It is to be noted that, while, in FIG. 21, word multiplexing, two-pixel multiplexing and frame multiplexing are carried out by three stages using three different RAMs, alternatively a single RAM may be used to produce a 4096×2160/47.95 P–60 P/4:4:4, 4:2:2/10-bit, 12-bit signal.

With the third embodiment described above, the mapping section 11 samples out a 4096×2160/71.928 P–90 P/4:4:4, 4:2:2/10-bit, 12-bit signal into three frames. Then, the mapping section 11 carries out two-pixel sampling out of mapping the pixel samples sampled out into the frames to first to fourth sub images. Then, the mapping section 11 carries out word sampling out. Therefore, the broadcasting cameras 1 can convert a 4096×2160/71.928 P–90 P/4:4:4, 4:2:2/10-bit, 12-bit signal into serial digital data of the bit rate of 10.692 Gbps and transmit the serial digital data to the CCU 2.

On the other hand, the CCU 2 can reproduce a 4096×2160/71.928 P–90 P/4:4:4, 4:2:2/10-bit, 12-bit signal from serial digital data of the bit rate of 10.692 Gbps. In other words, a 4k×2k signal can be transmitted by multi-channels of a 10.692 Gbps serial interface which is used heretofore. Therefore, upon signal transmission, existing equipments can be utilized effectively.

Further, the CCU 2 can transmit a 4096×2160/23.98 P–60 P signal and a 4096×2160/71.928 P–90 P signal of a speed as high as three times that of the 4096×2160/23.98 P–60 P signal in the 10G-SDI mode B of multi-channels.

When signals of 10G-SDI 24 channels are to be transmitted by a single optical fiber, a CWDM/DWDM wavelength multiplexing technique can be used.

Fourth Embodiment

4096×2160/71.928 P–90 P/4:4:4, 4:2:2/10 Bits, 12 Bits

Now, an example of operation of the mapping section 11 and the reproduction section 39 in the fourth embodiment of the present invention is described with reference to FIGS. 22 to 24.

Figure 22:
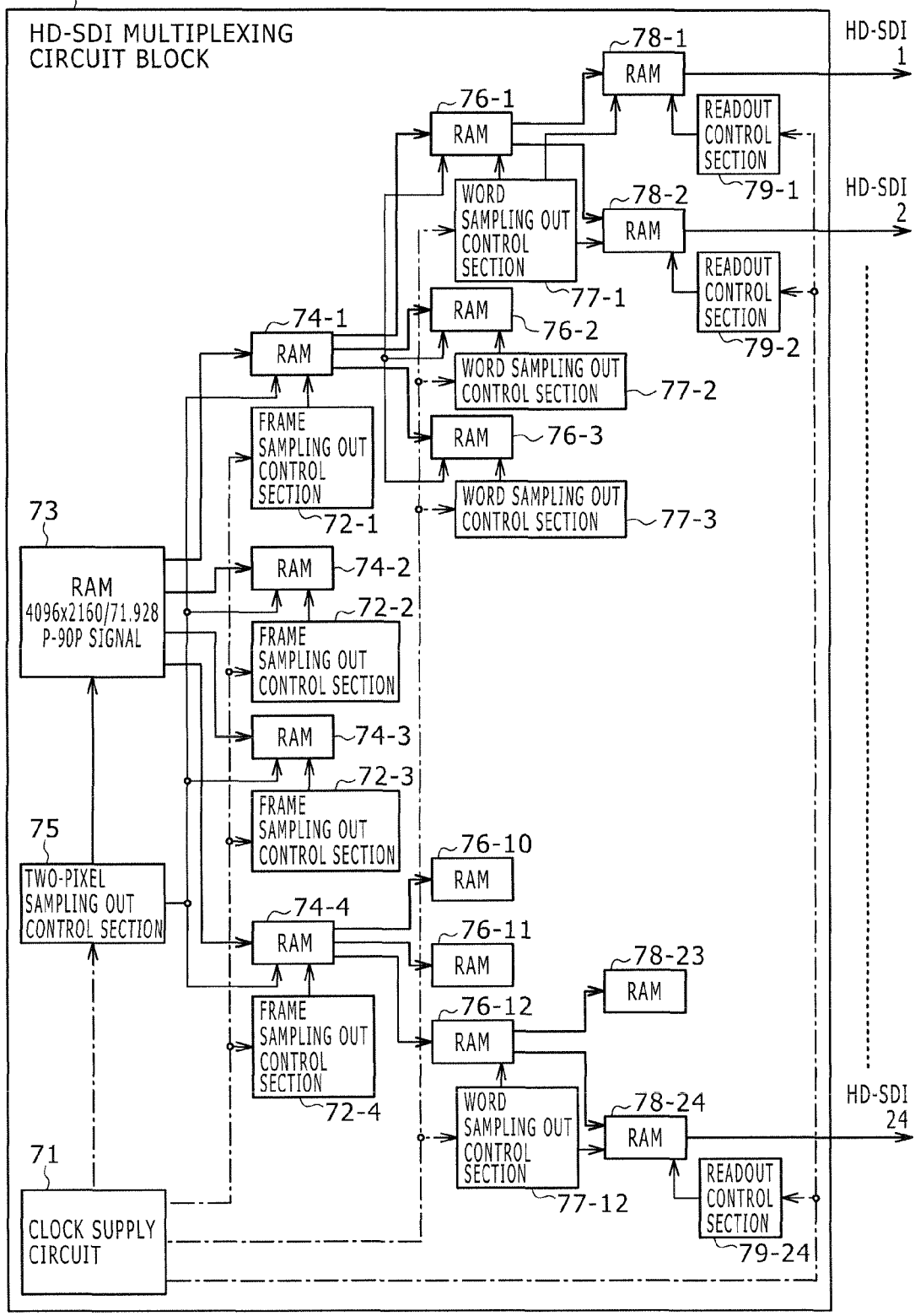
FIG. 22 is a block diagram showing an example of an internal configuration of a mapping section in a circuit configuration of a broadcasting camera according to a fourth embodiment of the present invention.

FIG. 22 shows an example of an internal configuration of the mapping section 11.

The mapping section 11 of the present example is similar to the mapping section 11 in the third embodiment described hereinabove except that the order in which two-pixel sampling out and frame sampling out are carried out is reversed. Therefore, only the difference is described below.

The mapping section 11 includes a two-pixel sampling out control section 75 for controlling two-pixel sampling out of reading out pixel samples two by two pixels from the RAM 73, and RAMs 74-1 to 74-4 for storing the pixel samples after the two-pixel sampling out by the two-pixel sampling out control section 75.

The mapping section 11 further includes frame sampling out control sections 72-1 to 72-4 for controlling frame sampling out of reading out pixel samples one by one frame from the RAMs 74-1 to 74-4. The mapping section 11 further includes 12 RAMs 76-1 to 76-12 for storing pixel samples after the frame sampling out.

If an image signal is an n-speed signal, then the frame sampling out control sections 72-1 to 72-4 sample out image signals from first to fourth sub images, produced by the two-pixel sampling out control section mapping pixel samples two by two pixels, into n frames to produce signals of n channels. In the present example, since the inputted image signal is a three-speed signal, the frame sampling out control sections 72-1 to 72-4 sample out the image signals from the first to fourth sub images into three frames to produce signals of three channels.

Further, the word sampling out control sections 77-1 to 77-12 sample out the pixel samples after the sampling out into signals of three channels for every word to map the pixel samples to HD-SDIs of the mode B and then map them to the RAMS 78-1 to 78-24.

The configuration of the other part and later operation of the mapping section 11 are similar to those described hereinabove with reference to FIG. 19.

Then, the mapping section 11 outputs HD-SDIs of totaling 24 channels.

Figure 23:
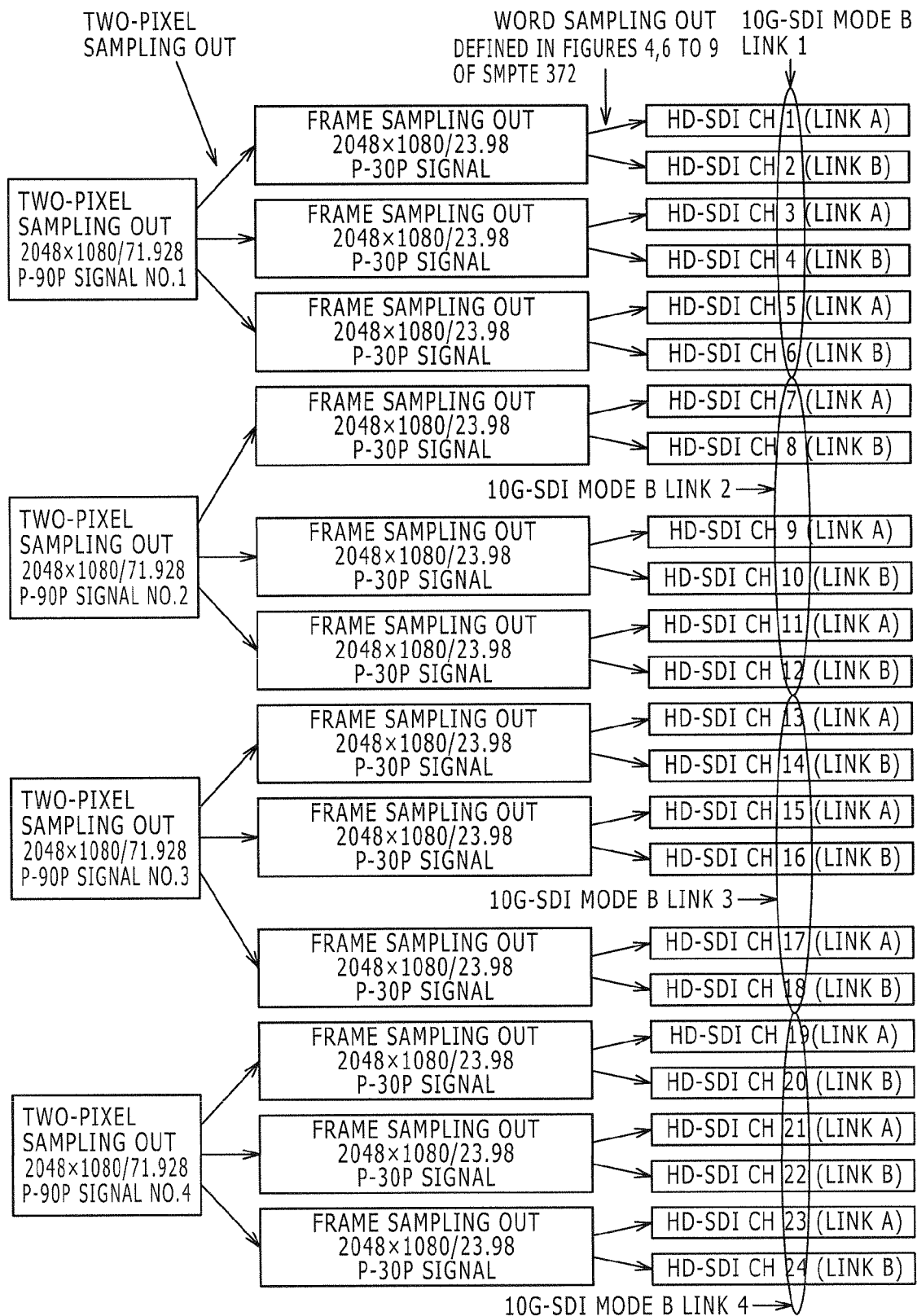
FIG. 23 is a diagrammatic view illustrating an example of frame sampling out in the case where a 4096×2160 signal is a three-speed signal according to the fourth embodiment of the present invention.
Figure 24:
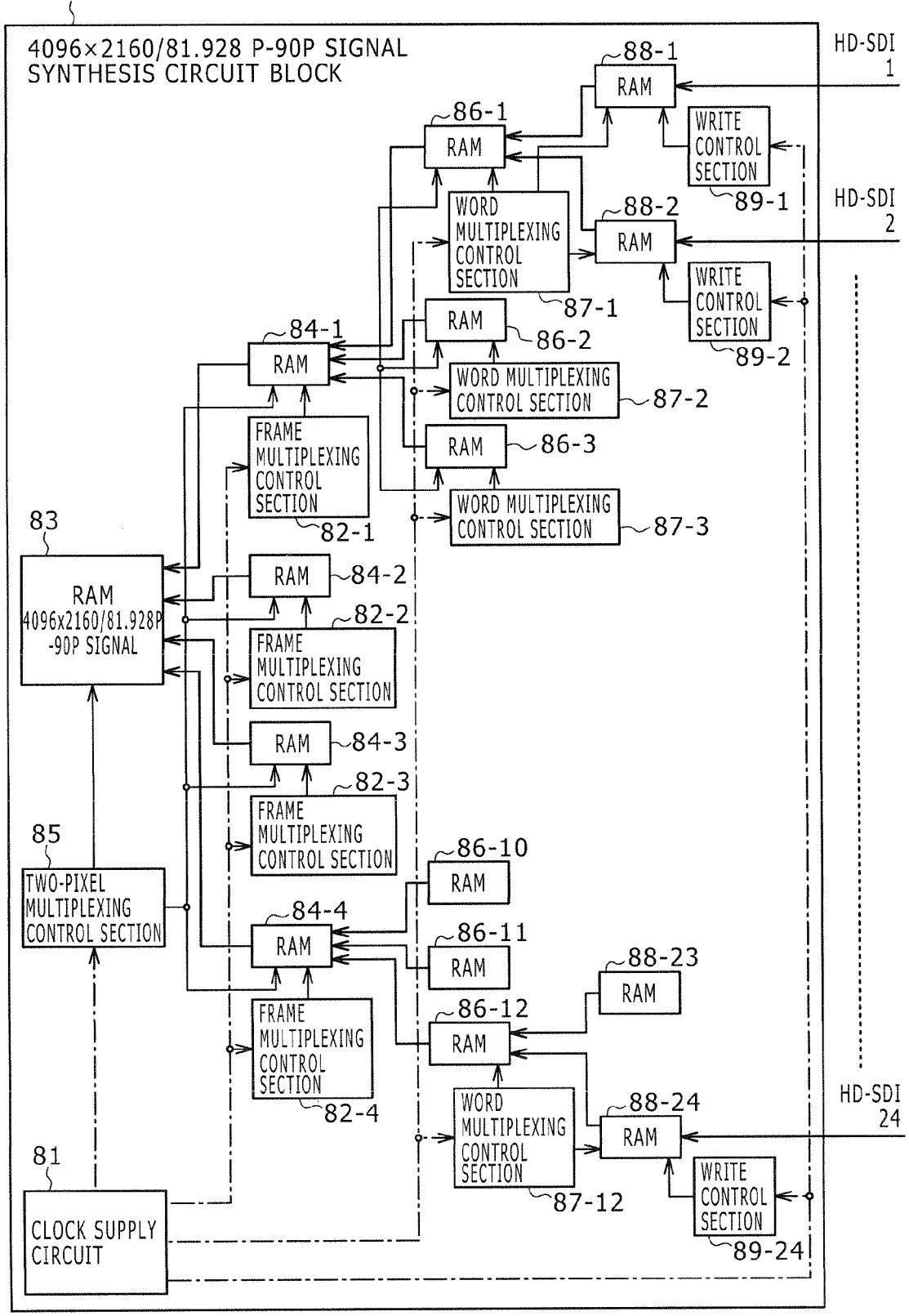
FIG. 24 is a block diagram showing an example of an internal configuration of a mapping section in the circuit configuration of a CCU according to the fourth embodiment of the present invention.

FIG. 23 illustrates mapping of signals after two-pixel sampling out to the active period of HD-SDIs of 24 channels.

First, the frame sampling out control sections 72-1 to 72-4 carry out frame sampling out of first to fourth sub images, which are formed by two-pixel sampling out and formed in the RAMs 74-1 to 74-4, for each frame. Then, the word sampling out control sections 77-1 to 77-12 map pixel samples read out from the first to fourth sub images after the frame sampling out to the links A and B. Consequently, the word sampling out control sections 77-1 to 77-12 map the pixel samples to HD-SDIs of totaling 24 channels.

Since setting of links and multiplexing of ANC/audio data are similar to those of the operation of the mapping section 11 and the multiplexing section 14 in the third embodiment described hereinabove, overlapping description of them is omitted herein to avoid redundancy.

FIG. 21 shows an example of an internal configuration of the reproduction section 39 of the CCU 2.

The reproduction section 39 includes RAMs 89-1 to 89-24 for storing 24 HD-SDIs 1 to 24 defined by the mode B of a 2048×1080/47.95I, 48I, 50I, 59.94I, 60I/4:4:4, 4:2:2/10-bit, 12-bit signal.

The RAMs 89-1 to 89-24 carry out writing control of the 24 HD-SDIs 1 to 24 inputted thereto in synchronism with a clock supplied thereto from the clock supplying circuit 81.

The reproduction section 39 further includes word multiplexing control sections 87-1 to 87-12 for controlling word multiplexing, and RAMs 86-1 to 86-12 into which data temporarily multiplexed by the word multiplexing control sections 87-1 to 87-12 are written. The word multiplexing control sections 87-1 to 87-12 form first to four sub images prescribed by the SMPTE 435-1 in the RAMs 86-1 to 86-12.

The reproduction section 39 further includes frame multiplexing control sections 82-1 to 82-4 for carrying out frame multiplexing of pixel samples read out from the RAMs 86-1 to 86-12, and RAMs 84-1 to 84-4 into which data multiplexed by the frame multiplexing control sections 82-1 to 82-4 are written.

The frame multiplexing control sections 82-1 to 82-4 are used in the case where an image signal whose pixel number of one frame exceeds the pixel number defined by the HD-SDI format is an n-speed signal. In particular, the frame multiplexing control sections 82-1 to 82-4 multiplex image signals obtained by the word multiplexing control sections 87-1 to 87-12 multiplexing pixel samples for every word for each n frames. Then, the frame multiplexing control sections 82-1 to 82-4 write the produced n-speed signals into the RAMs 84-1 to 84-4.

The reproduction section 39 further includes a two-pixel multiplexing control section 85-1 to 85-4 for carrying out two-pixel multiplexing of pixel samples read out from the RAMs 84-1 to 84-4. Into the RAM 83, a 4096×2160/71.928 P–90 P/4:4:4, 4:2:2/10-bit, 12-bit signal is stored, and this signal is reproduced suitably.

With the fourth embodiment described above, the mapping section 11 samples out a 4096×2160/71.928 P–90 P/4:4:4, 4:2:2/10-bit, 12-bit signal into three frames. Then, the mapping section 11 carries out two-pixel sampling out of mapping pixel samples sampled out to the frames to first to fourth sub images. Then, the mapping section 11 carries out word sampling out. Therefore, each broadcasting camera 1 can convert a 4096×2160/71.928 P–90 P/4:4:4, 4:2:2/10-bit, 12-bit signal into serial digital data of the bit rate of 10.692 Gbps and transmit the serial digital data to the CCU 2.

On the other hand, the CCU 2 can reproduce a 4096×2160/71.928 P–90 P/4:4:4, 4:2:2/10-bit, 12-bit signal from serial digital data of the bit rate of 10.692 Gbps. In other words, a 4k×2k signal can be transmitted by multi-channels of a 10.692 Gbps serial interface which is used heretofore. Therefore, upon signal transmission, existing equipments can be utilized effectively.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-036209 filed in the Japan Patent Office on Feb. 22, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A signal transmission apparatus, comprising:
a two-pixel sampling out control section adapted to sample out, when transmitting an image signal wherein the number of pixels of one frame exceeds a pixel number prescribed by an HD-SDI format whose pixel number of one frame is 4096 in the maximum.times.2160 in the maximum, two pixels adjacent each other on the same line from among pixel samples extracted from each frame defined by the image signal, sample out the pixel samples on each odd-numbered line of each frame alternately into a first sub image and a second sub image from among first to fourth sub images prescribed by the SMPTE 435-1 and sample out the pixel samples on each of even-numbered lines of each frame alternately into the third sub image and the fourth sub image to map the pixel samples to the first to fourth sub images; a word sampling out control section adapted to sample out the pixel samples sampled out into the first to fourth sub images for each word to map the first to fourth sub images to an active period of every two HD-SDIs of the mode B prescribed by the SMPTE 435-2; a multiplexing section adapted to multiplex, in the case where the image signal includes ANC/audio data, the ANC/audio data in a horizontal auxiliary data space of the HD-SDIs of the mode B formed based on the first to fourth sub images in a channel order of the HD-SDIs; and a readout control section adapted to output the HD-SDIs of the mode B.

2. The signal transmission apparatus according to claim 1, further comprising a line sampling out control section adapted to sample out the pixel samples of the first to fourth sub images mapped by said two-pixel sampling out control section for every other line;
said word sampling out control section sampling out the pixel samples sampled out for every other line for each word.

3. The signal transmission apparatus according to claim 1, further comprising a frame sampling out control section adapted to sample out, in the case where the image signal is an n-speed signal, the pixel samples for every n frames to produce signals of n channels,
said two-pixel sampling out control section mapping the pixel samples sampled out to the signals of n channels two by two pixels to the first to fourth sub images.

4. The signal transmission apparatus according to claim 1, further comprising a frame sampling out control section adapted to sample out, where the image signal is an n-speed signal, the image signal from the first to fourth sub images, to which the pixel samples are mapped two by two pixels by said two-pixel sampling out control section, into n frames to produce signals of n channels;
said word sampling out control section sampling out the pixel samples sampled out to the signals of n channels for each word to map the pixel samples to an active period of the HD-SDIs of the mode B.

5. A signal transmission method, comprising the steps of:
sampling out, when transmitting an image signal wherein the number of pixels of one frame exceeds a pixel number prescribed by an HD-SDI format whose pixel number of one frame is 4096 in the maximum.times.2160 in the maximum, two pixels adjacent each other on the same line from among pixel samples extracted from each frame defined by the image signal, sampling out the pixel samples on each odd-numbered line of each frame alternately into a first sub image and a second sub image from among first to fourth sub images prescribed by the SMPTE 435-1 and sampling out the pixel samples on each of even-numbered lines of each frame alternately into the third sub image and the fourth sub image to map the pixel samples to the first to fourth sub images; sampling out the pixel samples sampled out into the first to fourth sub images for each word to map the first to fourth sub images to an active period of every two HD-SDIs of the mode B prescribed by the SMPTE 435-2; a multiplexing section adapted to multiplex, in the case where the image signal includes ANC/audio data, the ANC/audio data in a horizontal auxiliary data space of the HD-SDIs of the mode B formed based on the first to fourth sub images in a channel order of the HD-SDIs; and outputting the HD-SDIs of the mode B.

6. A signal reception apparatus, comprising:
a write control section adapted to store HD-SDIs of the mode B prescribed by the SMPTE 435-2 into a storage section; a word multiplexing control section adapted to multiplex pixel samples extracted from an active period of the HD-SDIs of the mode B read out from said storage section into first to fourth sub images prescribed by the SMPTE 435-1 for each word; a separation section adapted to separate, in the case where the image signal includes ANC/audio data, the ANC/audio data from a horizontal auxiliary data space of the HD-SDIs of the mode B formed based on the first to fourth sub images in a channel order of the HD-SDIs; and a two-pixel multiplexing control section adapted to multiplex the pixel samples extracted two by two pixels from the first sub image and the second sub image in an adjacent relationship on an odd-numbered line of a frame defined by an image signal wherein the number of pixels of one frame exceeds a pixel number prescribed by an HD-SDI format whose pixel number of one frame is 4096 in the maximum.times.2160 in the maximum and multiplex the pixel samples extracted two by two pixels from the third sub image and the fourth sub image in an adjacent relationship on an even-numbered line of a frame defined by the image signal.

7. The signal reception apparatus according to claim 6, further comprising a line multiplexing control section adapted to multiplex the pixel samples multiplexed by said word multiplexing control section for every other line into the first to fourth sub images.

8. The signal reception apparatus according to claim 6, further comprising a frame multiplexing control section adapted to multiplex, in the case where the image signal wherein the number of pixels of one frame exceeds the pixel number prescribed by the HD-SDI format is an n-speed signal, the image signal with which the pixel samples are multiplexed two by two pixels by said two-pixel multiplexing control section for each n frames to produce an n-speed signal.

9. The signal reception apparatus according to claim 6, further comprising a frame multiplexing control section adapted to multiplex, where the image signal wherein the number of pixels of one frame exceeds the pixel number prescribed by the HD-SDI format is an n-speed signal, the image signal with which the pixel samples are multiplexed for each word by said word multiplexing control section for each n frames to produce an n-speed signal.

10. A signal reception method, comprising the steps of:
storing HD-SDIs of the mode B prescribed by the SMPTE 435-2 into a storage section; multiplexing pixel samples extracted from an active period of the HD-SDIs of the mode B read out from the storage section into first to fourth sub images prescribed by the SMPTE 435-1 for each word; a separation section adapted to separate, in the case where the image signal includes ANC/audio data, the ANC/audio data from a horizontal auxiliary data space of the HD-SDIs of the mode B formed based on the first to fourth sub images in a channel order of the HD-SDIs; and multiplexing the pixel samples extracted two by two pixels from the first sub image and the second sub image in an adjacent relationship on an odd-numbered line of a frame defined by an image signal wherein the number of pixels of one frame exceeds a pixel number prescribed by an HD-SDI format whose pixel number of one frame is 4096 in the maximum.times.2160 in the maximum and multiplexing the pixel samples extracted two by two pixels from the third sub image and the fourth sub image in an adjacent relationship on an even-numbered line of a frame defined by the image signal.

11. A signal transmission system, comprising:
a signal transmission apparatus including a two-pixel sampling out control section adapted to sample out, when transmitting an image signal wherein the number of pixels of one frame exceeds a pixel number prescribed by an HD-SDI format whose pixel number of one frame is 4096 in the maximum.times.2160 in the maximum, two pixels adjacent each other on the same line from among pixel samples extracted from each frame defined by the image signal, sample out the pixel samples on each odd-numbered line of each frame alternately into a first sub image and a second sub image from among first to fourth sub images prescribed by the SMPTE 435-1 and sample out the pixel samples on each of even-numbered lines of each frame alternately into the third sub image and the fourth sub image to map the pixel samples to the first to fourth sub images, a word sampling out control section adapted to sample out the pixel samples sampled out into the first to fourth sub images for each word to map the first to fourth sub images to an active period of every two HD-SDIs of the mode B prescribed by the SMPTE 435-2; a multiplexing section adapted to multiplex, in the case where the image signal includes ANC/audio data, the ANC/audio data in a horizontal auxiliary data space of the HD-SDIs of the mode B formed based on the first to fourth sub images in a channel order of the HD-SDIs; and a readout control section adapted to output the HD-SDIs of the mode B; and a signal reception apparatus including a write control section adapted to store the HD-SDIs of the mode B into a storage section, a word multiplexing control section adapted to multiplex pixel samples extracted from an active period of the HD-SDIs of the mode B read out from said storage section into the first to fourth sub images for each word, and a two-pixel multiplexing control section adapted to multiplex the pixel samples extracted two by two pixels from the first sub image and the second sub image in an adjacent relationship on an odd-numbered line of a frame defined by an image signal wherein the number of pixels of one frame exceeds a pixel number prescribed by the HD-SDI format and multiplex the pixel samples extracted two by two pixels from the third sub image and the fourth sub image in an adjacent relationship on an even-numbered line of a frame defined by the image signal.

12. A signal transmission apparatus, comprising:
two-pixel sampling out control means for sampling out, when transmitting an image signal wherein the number of pixels of one frame exceeds a pixel number prescribed by an HD-SDI format whose pixel number of one frame is 4096 in the maximum.times.2160 in the maximum, two pixels adjacent each other on the same line from among pixel samples extracted from each frame defined by the image signal, sampling out the pixel samples on each odd-numbered line of each frame alternately into a first sub image and a second sub image from among first to fourth sub images prescribed by the SMPTE 435-1 and sampling out the pixel samples on each of even-numbered lines of each frame alternately into the third sub image and the fourth sub image to map the pixel samples to the first to fourth sub images; word sampling out control means for sampling out the pixel samples sampled out into the first to fourth sub images for each word to map the first to fourth sub images to an active period of every two HD-SDIs of the mode B prescribed by the SMPTE 435-2; a multiplexing section adapted to multiplex, in the case where the image signal includes ANC/audio data, the ANC/audio data in a horizontal auxiliary data space of the HD-SDIs of the mode B formed based on the first to fourth sub images in a channel order of the HD-SDIs; and readout control means for outputting the HD-SDIs of the mode B.

13. A signal reception apparatus, comprising:
write control means for storing HD-SDIs of the mode B prescribed by the SMPTE 435-2 into a storage means; word multiplexing control means for multiplexing pixel samples extracted from an active period of the HD-SDIs of the mode B read out from said storage means into first to fourth sub images prescribed by the SMPTE 435-1 for each word; a separation section adapted to separate, in the case where the image signal includes ANC/audio data, the ANC/audio data from a horizontal auxiliary data space of the HD-SDIs of the mode B formed based on the first to fourth sub images in a channel order of the HD-SDIs; and two-pixel multiplexing control means for multiplexing the pixel samples extracted two by two pixels from the first sub image and the second sub image in an adjacent relationship on an odd-numbered line of a frame defined by an image signal wherein the number of pixels of one frame exceeds a pixel number prescribed by an HD-SDI format whose pixel number of one frame is 4096 in the maximum.times.2160 in the maximum and multiplexing the pixel samples extracted two by two pixels from the third sub image and the fourth sub image in an adjacent relationship on an even-numbered line of a frame defined by the image signal.

* * * * *

UNITED STATES PATENT AND TRADEMARK OFFICE
CERTIFICATE OF CORRECTION

PATENT NO. : 8,422,547 B2
APPLICATION NO. : 13/028296
DATED : April 16, 2013
INVENTOR(S) : Shigeyuki Yamashita It is certified that error appears in the above-identified patent and that said Letters Patent is hereby corrected as shown below:

Title Page, Item (75) Inventor:

Please change the inventor's name Shigeyki Yamashita to

--Shigeyuki Yamashita--.

Signed and Sealed this
Second Day of July, 2013

Teresa Stanek Rea
*Acting Director of the United States Patent and Trademark Office*